United States Patent
Yang

(10) Patent No.: US 12,025,367 B2
(45) Date of Patent: Jul. 2, 2024

(54) REFRIGERATOR

(71) Applicant: WINIA ELECTRONICS CO., LTD., Gwangju (KR)

(72) Inventor: Sung Jin Yang, Gwangju (KR)

(73) Assignee: WINIA ELECTRONICS CO., LTD., Gwangju (KR)

( * ) Notice: Subject to any disclaimer, the term of this patent is extended or adjusted under 35 U.S.C. 154(b) by 519 days.

(21) Appl. No.: 17/408,748

(22) Filed: Aug. 23, 2021

(65) Prior Publication Data
US 2022/0057135 A1    Feb. 24, 2022

(30) Foreign Application Priority Data

Aug. 21, 2020   (KR) .................. 10-2020-0105522
Aug. 21, 2020   (KR) .................. 10-2020-0105524
Aug. 28, 2020   (KR) .................. 10-2020-0109556

(51) Int. Cl.
*F25D 23/12*     (2006.01)
*C02F 1/461*     (2023.01)
*F25D 23/04*     (2006.01)

(52) U.S. Cl.
CPC ........ *F25D 23/126* (2013.01); *C02F 1/46104* (2013.01); *F25D 23/04* (2013.01); *C02F 2201/007* (2013.01); *C02F 2307/12* (2013.01); *F25D 2400/40* (2013.01)

(58) Field of Classification Search
CPC .... F25D 23/126; F25D 23/04; F25D 23/4676; F25D 2400/40; C02F 1/46104; C02F 2201/007; C02F 2201/46115; C02F 2307/12
See application file for complete search history.

(56) References Cited

FOREIGN PATENT DOCUMENTS

| | | | | |
|---|---|---|---|---|
| CN | 108467090 A | * | 8/2018 | ............... C02F 1/68 |
| CN | 209695120 U | * | 11/2019 | |
| CN | 111115920 A | * | 5/2020 | ............ C02F 1/4618 |
| KR | 10-2015-0092822 A | | 8/2015 | |
| KR | 10-1746077 B1 | | 6/2017 | |
| KR | 20180007236 A | * | 1/2018 | ........... B01D 35/306 |
| KR | 101859970 B1 | * | 5/2018 | ............. C02F 1/008 |
| KR | 10-2019-0135673 A | | 12/2019 | |
| KR | 20190135673 A | * | 12/2019 | ............... F25D 1/68 |
| KR | 20200025451 A | * | 3/2020 | ............ C02F 1/4676 |
| KR | 20200131544 A | * | 11/2020 | ........... B67D 1/0085 |
| KR | 20200131715 A | * | 11/2020 | ............... B67D 7/42 |
| WO | WO-2018066769 A1 | * | 4/2018 | ............... B01F 1/00 |

* cited by examiner

*Primary Examiner* — Emmanuel E Duke
(74) *Attorney, Agent, or Firm* — Stein IP, LLC

(57) ABSTRACT

The present disclosure relates to a refrigerator in which an internal volume is maximized and efficiency of a hydrogen water module is maximized. The present disclosure relates to a refrigerator with improved ease of use and improved serviceability by replacing a hydrogen water module without using a tool. The present disclosure relates to a refrigerator that can prevent hydrogen from remaining on an upper side inside a hydrogen water module and can also prevent an amount of hydrogen dissolved in hydrogen water from being reduced.

15 Claims, 21 Drawing Sheets

REFRIGERATOR

CROSS-REFERENCE TO RELATED APPLICATIONS

This application claims the benefit of Korea Patent Application Nos. 10-2020-0105522 and 10-2020-0105524, filed on Aug. 21, 2020, and Korea Patent Application No. 10-2020-0109556, filed on Aug. 28, 2020, which are incorporated herein by reference for all purposes as if fully set forth herein.

TECHNICAL FIELD

The present disclosure relates to a refrigerator capable of producing hydrogen water, and also relates to a refrigerator in which an internal volume is maximized and efficiency of a hydrogen water module is maximized.

The present disclosure relates to a refrigerator capable of producing hydrogen water, and also relates to a refrigerator with improved ease of use and improved serviceability by replacing a hydrogen water module without using a tool.

The present disclosure relates to a refrigerator, and more specifically, relates to a refrigerator that can prevent hydrogen from remaining on an upper side inside a hydrogen water module and can also prevent an amount of hydrogen dissolved in hydrogen water from being reduced.

BACKGROUND

Recently, while an environmental pollution problem has become a global issue, a desire for an individual to lead a healthy life is gradually increasing. In particular, in relation to this desire, an interest in water, which is one of the essential elements in human life, is greatly increasing.

Various types of water purifiers, water ionizers, hydrogen water makers, etc. with various functions are currently being sold in the market for the purpose of drinking more clean or more healthful water. Such water purifiers, water ionizers, hydrogen water production devices, etc. are used in various forms, such as being installed on one side of an indoor space, such as a kitchen, a restaurant, and an office, or manufactured in a portable form.

In particular, as hydrogen is recently known to effectively remove active oxygen present in the human body, a demand for hydrogen water with a high dissolved amount of hydrogen in normal water is rapidly increasing. Hence, the hydrogen water-related market is growing explosively.

A technology on a hydrogen water module to make hydrogen water is disclosed in Korean Patent Application Publication No. 10-2015-0092822 (Patent Document 1) and Korean Patent No. 10-1746077 (Patent Document 2).

A hydrogen water module is generally comprised of a water inlet port into which water is introduced, a negative (−) electrode member and a positive (+) electrode member for separating hydrogen and oxygen from the introduced water, and a diaphragm that is disposed between the negative electrode member and the positive electrode member to prevent a water leakage.

A technology that applies a hydrogen water module to a refrigerator so that hydrogen water can be easily drunk is disclosed in Korean Patent Application Publication No. 10-2019-0135673 (Patent Document 3).

The patent document 3 discloses a refrigerator comprising a module body having a storage space and an ice making chamber, a dispenser that is provided in a door with a handle and is connected to the ice making chamber, and a hydrogen water module that is connected to the dispenser and converts water to be supplied into hydrogen water. Further, a supply part is formed at the center of an upper part of the hydrogen water module, and an outlet portion is formed on an outer peripheral surface of the upper part of the hydrogen water module.

Because the hydrogen water module uses water and conducts electrolysis, water scale is generated between the negative electrode member, the positive electrode member, and the diaphragm inside the hydrogen water module depending on the quality of water used and a period of use. Hence, an electrolysis capability of the hydrogen water module is lowered, and the efficiency of the amount of dissolved hydrogen is reduced.

The dispenser is usually provided in the door. Therefore, in order to supply hydrogen water with high solubility, it is preferable that the hydrogen water module is installed at a position close to the dispenser as in the patent document 3. However, in the patent document 3, since the hydrogen water module was installed inside the door, it was difficult for a non-expert user to replace the hydrogen water module.

The hydrogen water module needs to accommodate many components in a small space to maximize the internal volume of the refrigerator. In addition, it is good to have the aesthetics, usability, and ease of service of the refrigerator while applying the hydrogen water module.

In the patent document 3, since an outlet port of a hydrogen water generator is positioned below than a supply part, hydrogen generated in an electrode body inside the hydrogen water module is not dissolved in water and remains on an upper side of the hydrogen water module. Therefore, there is a problem in that the amount of dissolved hydrogen in the hydrogen water is reduced, thereby reducing the overall efficiency of the hydrogen water production.

Further, in the patent document 3, there is a problem in that it is not easy to manage the hydrogen water module because the hydrogen water module needs to be frequently cleaned due to hydrogen remaining on the upper side of the hydrogen water module.

Further, in the patent document 3, the outlet port is formed in the outer peripheral surface of the hydrogen water module, and a direction of the outlet port intersects a discharge direction of hydrogen water that is discharged while moving from the lower side to the upper side inside the hydrogen water module. Therefore, there is a problem in that hydrogen water is not smoothly discharged.

In addition, in the patent document 3, there is a problem in that water introduced through the supply part may be directly discharged to the outlet port without undergoing electrolysis.

PRIOR ART DOCUMENT (Patent Document 1) Korean Patent Application Publication No. 10-2015-0092822 (Aug. 17, 2015)
(Patent Document 2) Korean Patent No. 10-1746077 (Jun. 5, 2017)
(Patent Document 3) Korean Patent Application Publication No. 10-2019-0135673 (Dec. 9, 2019)

SUMMARY

In order to solve the above-described and other needs and/or problems, an object of the present disclosure is to provide a refrigerator with improved assembly and improved serviceability, such as the replacement of a hydrogen water module.

Another object of the present disclosure is to provide a refrigerator in which an internal volume is maximized.

Another object of the present disclosure is to provide a refrigerator in which efficiency of a hydrogen water module is maximized.

Another object of the present disclosure is to provide a refrigerator in which a hydrogen water module is protected.

Another object of the present disclosure is to provide a refrigerator capable of replacing a hydrogen water module without using a tool.

Another object of the present disclosure is to provide a refrigerator in which it is easy to assemble a hydrogen water module.

Another object of the present disclosure is to provide a refrigerator in which a water leakage is prevented in a hydrogen water module.

Another object of the present disclosure is to provide a refrigerator that can prevent hydrogen from remaining on an upper side inside a hydrogen water module since a water outlet port of the hydrogen water module is positioned above than a water inlet port, and can also prevent an amount of hydrogen dissolved in hydrogen water from being reduced.

In order to achieve the above-described and other objects, in one aspect of the present disclosure, there is provided a refrigerator comprising a refrigerator body having a storage space; a door provided in the refrigerator body and configured to open and close the storage space; a water supply tank provided in the refrigerator body or the door; a holder provided at one side of the door; and a hydrogen water module coupled to the holder.

The hydrogen water module includes a water inlet port connected to the water supply tank, and a water outlet port connected to a dispenser provided in the door. The water outlet port is formed at an upper part of the hydrogen water module.

The water outlet port is positioned above than the water inlet port.

The water inlet port is formed radially around the water outlet port.

The hydrogen water module includes a module body. A head is coupled to the holder, and the module body is assembled to the head.

The head includes an assembly guide portion, and the module body includes a catching portion corresponding to the assembly guide portion.

At least a part of the assembly guide portion is formed spirally.

The head further includes caught portions at both sides of the assembly guide portion, and the catching portions are formed at both sides of the module body so that the catching portions are assembled to the caught portions.

The module body includes a water outlet portion that is formed protrudingly, and the head further includes an insertion portion into which the water outlet portion is inserted.

The module body includes a body in which the water outlet portion is formed, and water is accommodated in the body. A first packing is positioned between the water outlet portion and the insertion portion, and a second packing is positioned between the body and the head.

A module accommodation hole is formed in a lower side of the holder. The hydrogen water module is accommodated in the module accommodation hole, and at least a part of the hydrogen water module is positioned inside the holder.

A part of the hydrogen water module is positioned below than the module accommodation hole and protrudes to an outside of the holder. The refrigerator further comprises a cap configured to accommodate a part of the hydrogen water module protruding from the holder.

The refrigerator further comprises a pocket of which a lower part is coupled to the holder.

The pocket includes a case and a cover installed inside the case, and a case hole is formed in a lower side of the case. At least a part of a hose and an electric wire connected to the hydrogen water module is accommodated in the case via the case hole.

The case hole communicates with the holder. At least a part of a hose and an electric wire connected to the hydrogen water module is accommodated in the case via the holder and the case hole.

The refrigerator according to the present disclosure has the following effects.

The present disclosure can maximize an internal volume of the refrigerator by installing a hydrogen water module and related components of the hydrogen water module, such as a valve, a hose, an electric wire, etc., in a side space smaller than an upper space of the door.

Since the present disclosure can assemble and disassemble the head only by rotating the module body, the module body can be easily replaced without using a tool. Therefore, the electrode member and the diaphragm with scale can be easily replaced, and assembly and serviceability are improved.

Since the hydrogen water module and the valve are positioned on the side of the dispenser, they are very close to the outlet port. Hence, the present disclosure maximizes the efficiency of the hydrogen water module because the user can drink hydrogen water with high solubility.

The present disclosure can assemble the hydrogen water module through a simple configuration in which a first protrusion of the head is inserted into a first catching groove of the holder. Accordingly, the hydrogen water module can be supported by the holder so that it does not move up, down, left and right.

The present disclosure can assemble the valve through a simple configuration in which a second protrusion of the valve is inserted into a second catching groove of the holder. Accordingly, the valve can be supported by the holder so that it does not move up, down, left and right.

In the present disclosure, the lower part of the hydrogen water module is protected by the cap, and the lower part of the hydrogen water module is exposed when the cap is separated from the holder. Therefore, it is easy to separate, check, and replace the hydrogen water module.

The present disclosure can prevent a water leakage in the hydrogen water module by the first packing and the second packing.

The present disclosure can maximize an internal volume of the refrigerator by installing the hydrogen water module and the related components of the hydrogen water module in the pocket and a side space smaller than an upper space.

Since the hydrogen water module and the valve are positioned on the side of the dispenser, they are very close to the outlet port. Hence, the present disclosure maximizes the efficiency of the hydrogen water module because the user can drink hydrogen water with high solubility.

The present disclosure can prevent hydrogen from remaining on an upper side inside the hydrogen water module since a water outlet port of the hydrogen water module is positioned above than a water inlet port, and can also prevent an amount of hydrogen dissolved in hydrogen water from being reduced. As a result, the present disclosure can increase efficiency of hydrogen water production.

Since the present disclosure can prevent hydrogen from remaining on an upper side inside the hydrogen water module, cleaning can be minimized and thus maintenance is easy.

BRIEF DESCRIPTION OF THE DRAWINGS

The accompanying drawings, which are included to provide a further understanding of the disclosure and are incorporated in and constitute a part of the disclosure, illustrate embodiments of the disclosure and together with the description serve to explain the principle of the disclosure.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. It will be noted that a detailed description of known arts will be omitted if it is determined that the detailed description of the known arts can obscure the embodiments of the disclosure.

The terms disclosed herein are used to merely refer to a specific embodiment and does not intend to limit the present disclosure. A singular expression can include a plural expression as long as it does not have an apparently different meaning in context. In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

Figure 1:
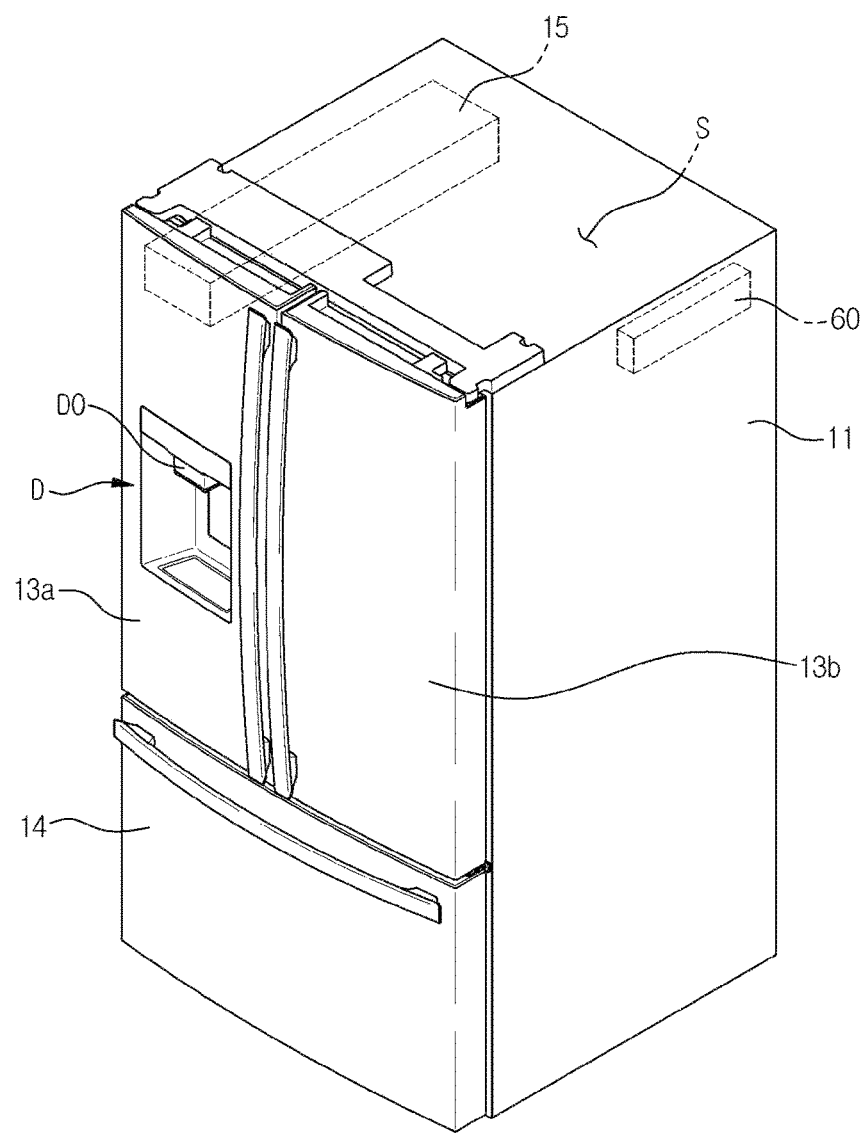
FIG. 1 is a perspective view of a refrigerator according to an embodiment to which the present disclosure is applied.
Figure 2:
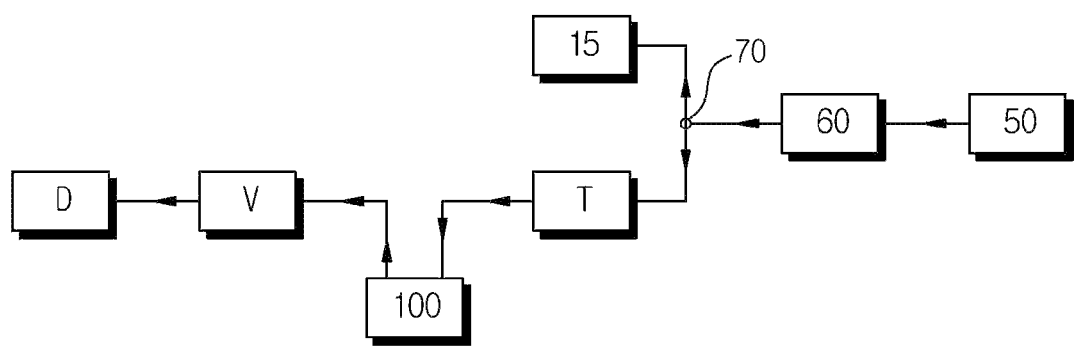
FIG. 2 is a block diagram of a refrigerator according to an embodiment of the present disclosure.
Figure 3A:
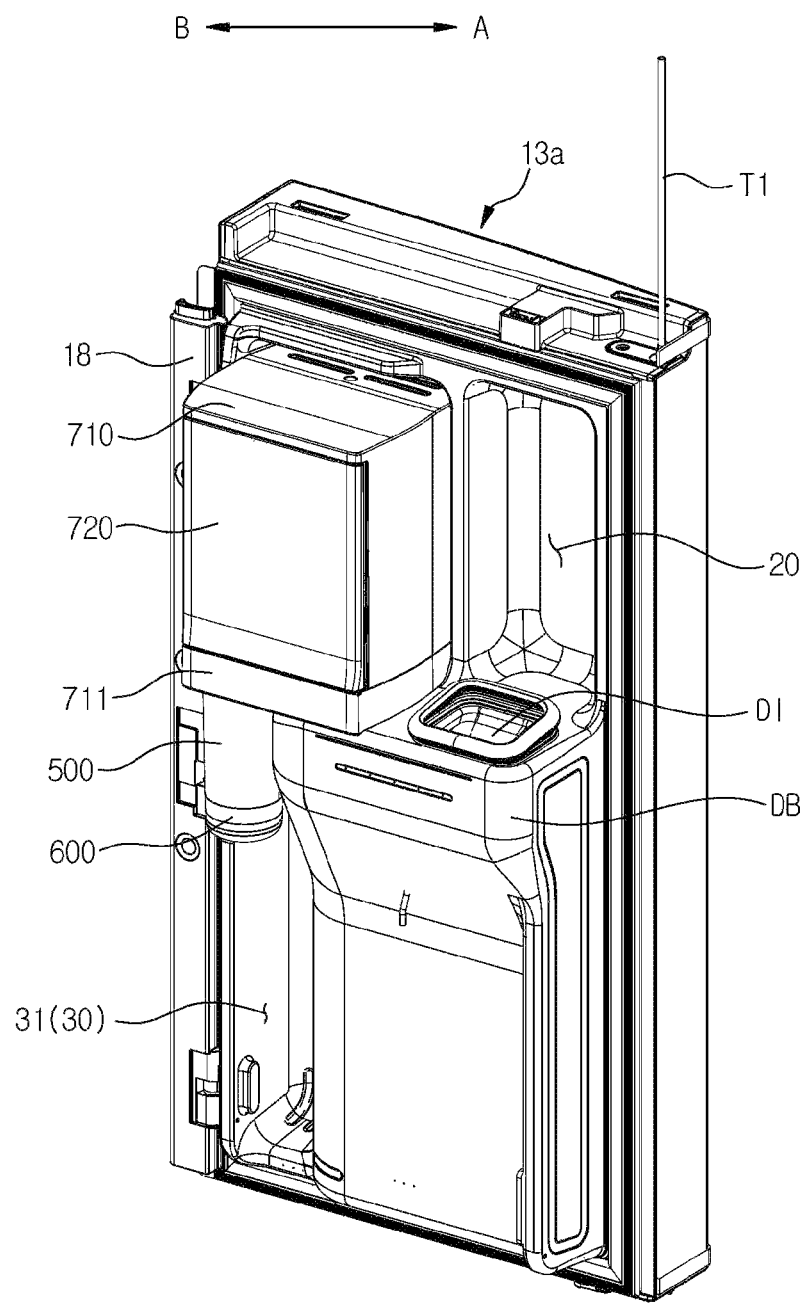
FIG. 3A is a rear perspective view of a refrigerator compartment door illustrated in FIG. 1.
Figure 3B:
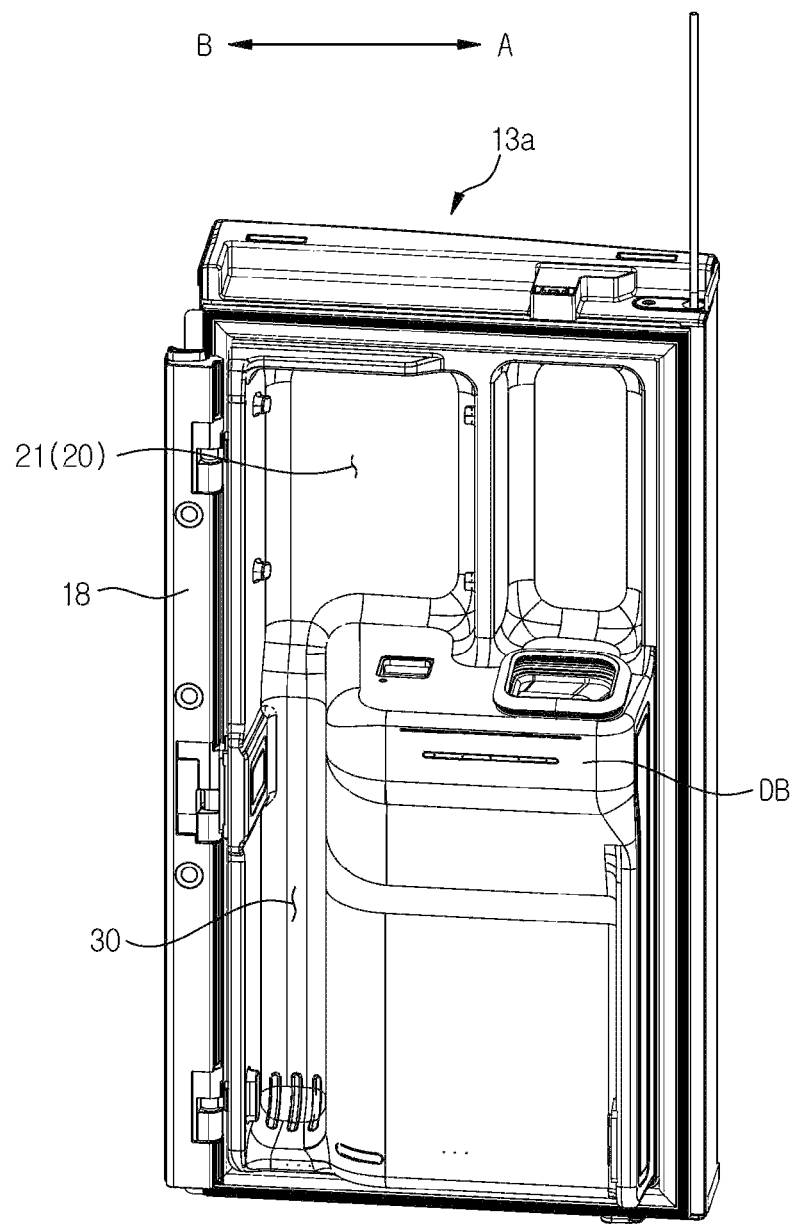
FIG. 3B illustrates a rear of a refrigerator compartment door.
Figure 4:
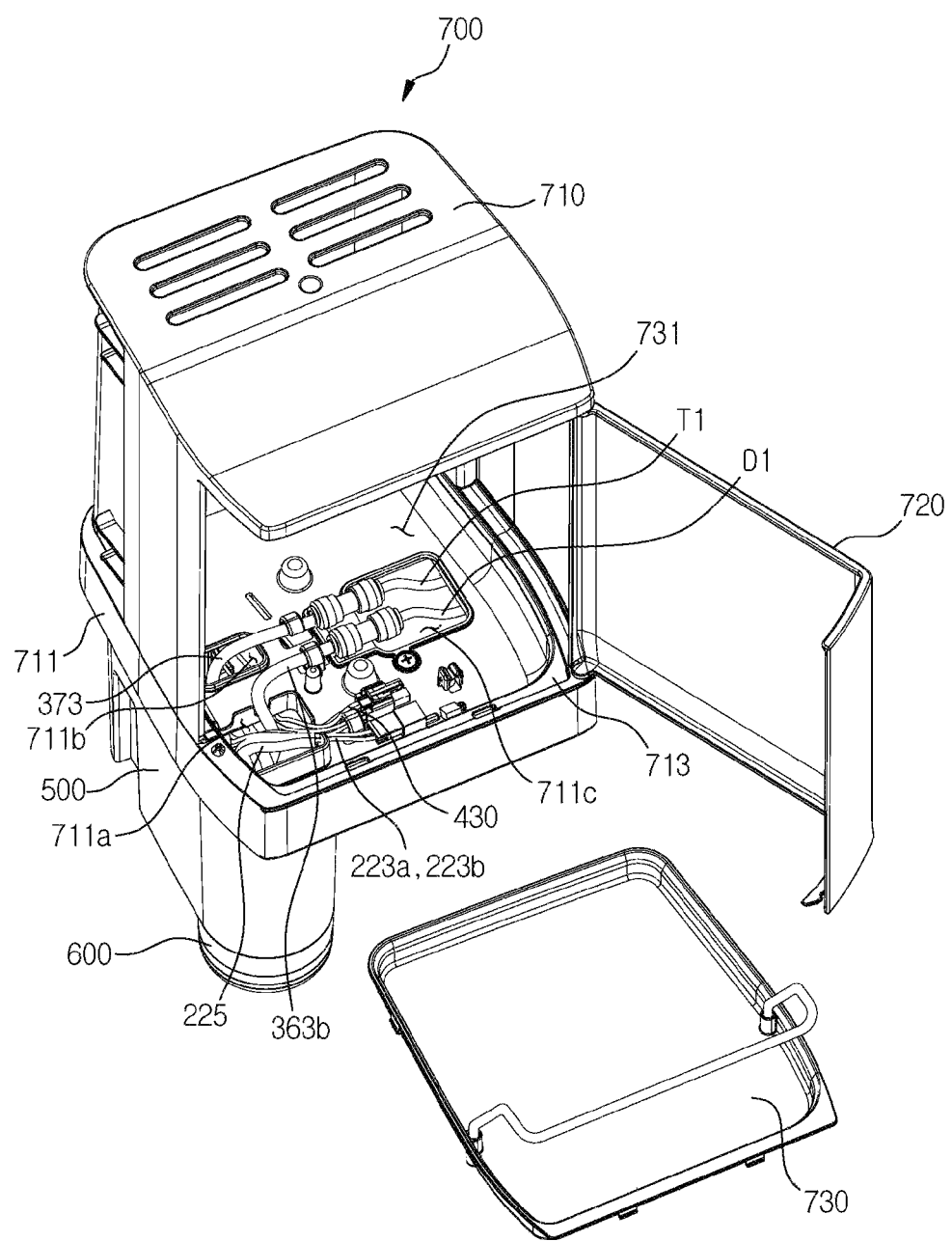
FIG. 4 is an exploded perspective view of a pocket.
Figure 5:
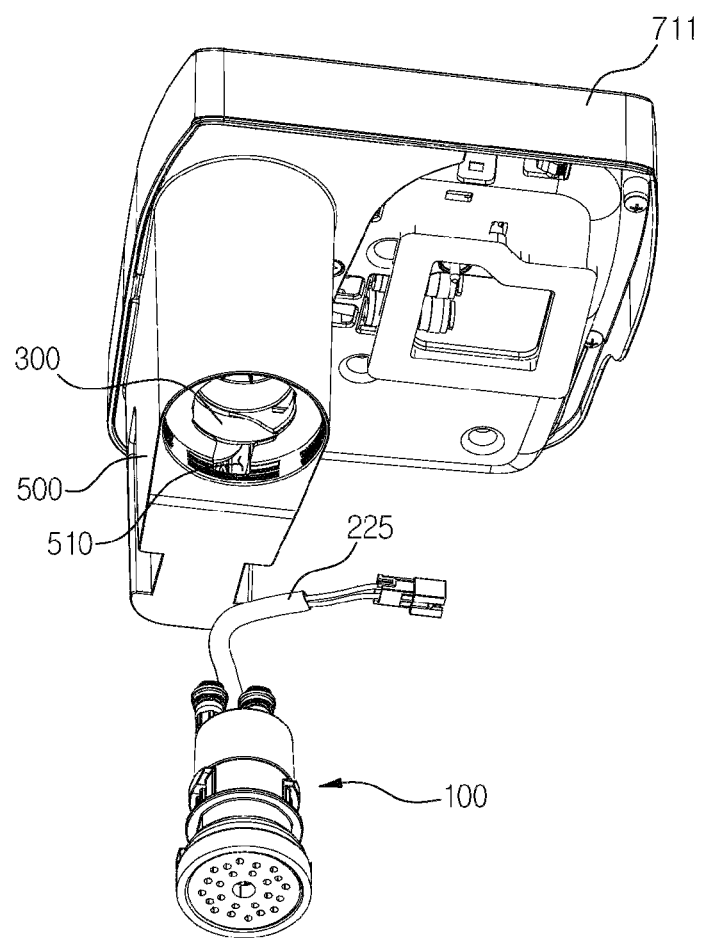
FIG. 5 is an exploded perspective view of a holder and a hydrogen water module.
Figure 6:
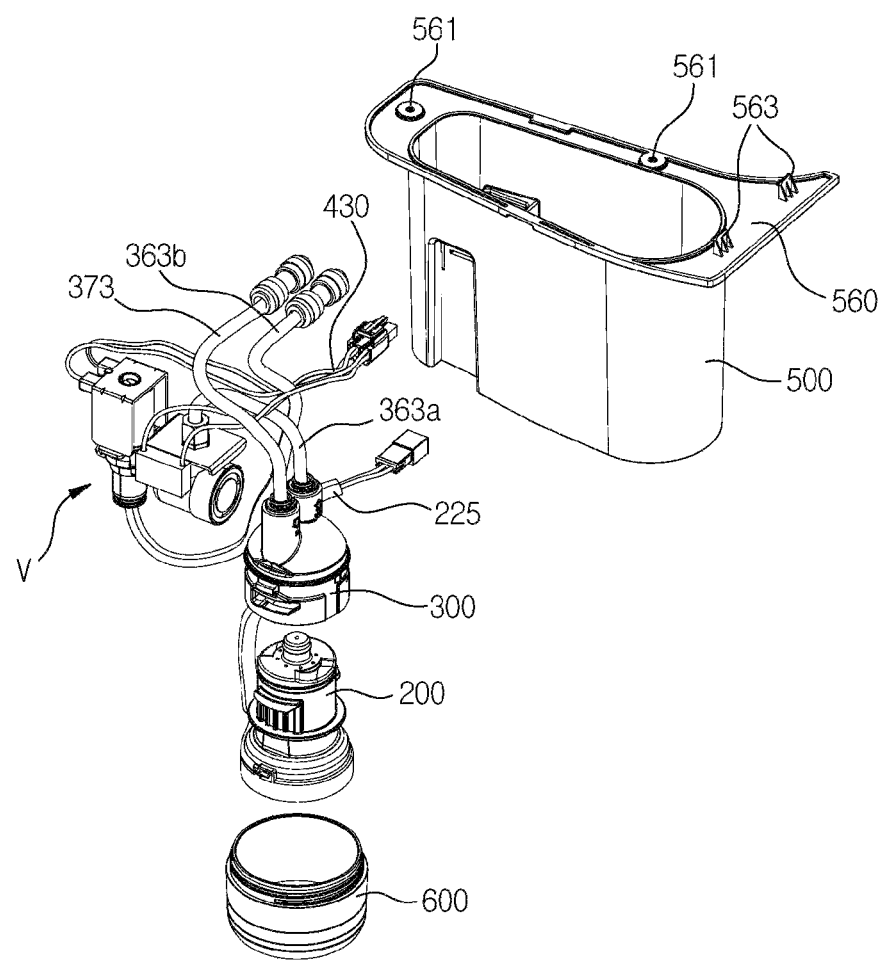
FIG. 6 is an exploded perspective view of a holder, a hydrogen water module, and a valve.
Figure 7:
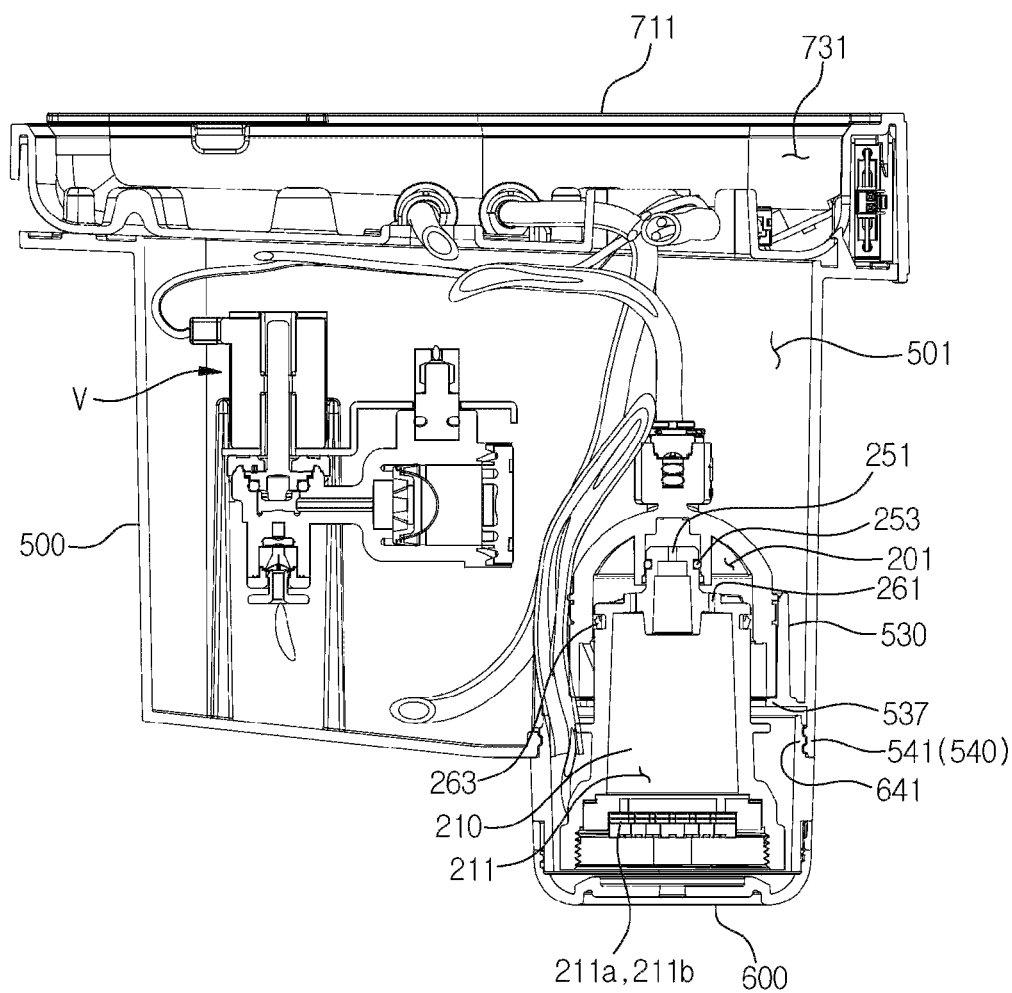
FIG. 7 is a cross-sectional view illustrating an internal arrangement of a holder.
Figure 8:
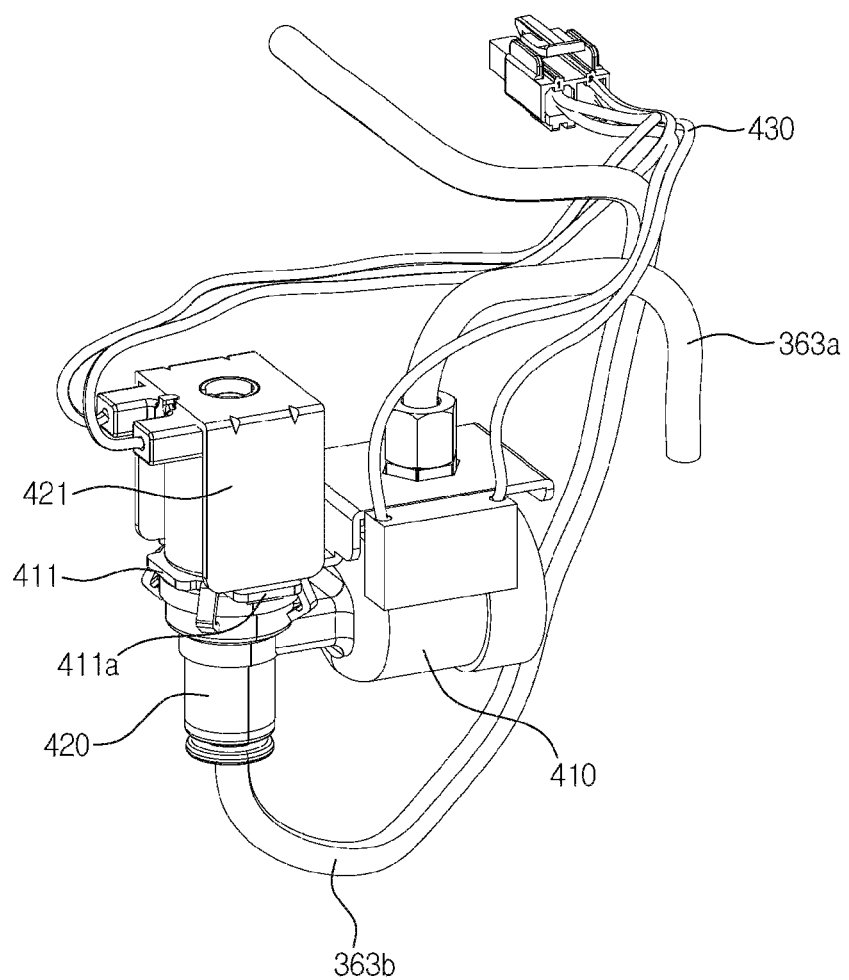
FIG. 8 is a perspective view of a valve and a water outlet hose.
Figure 9:
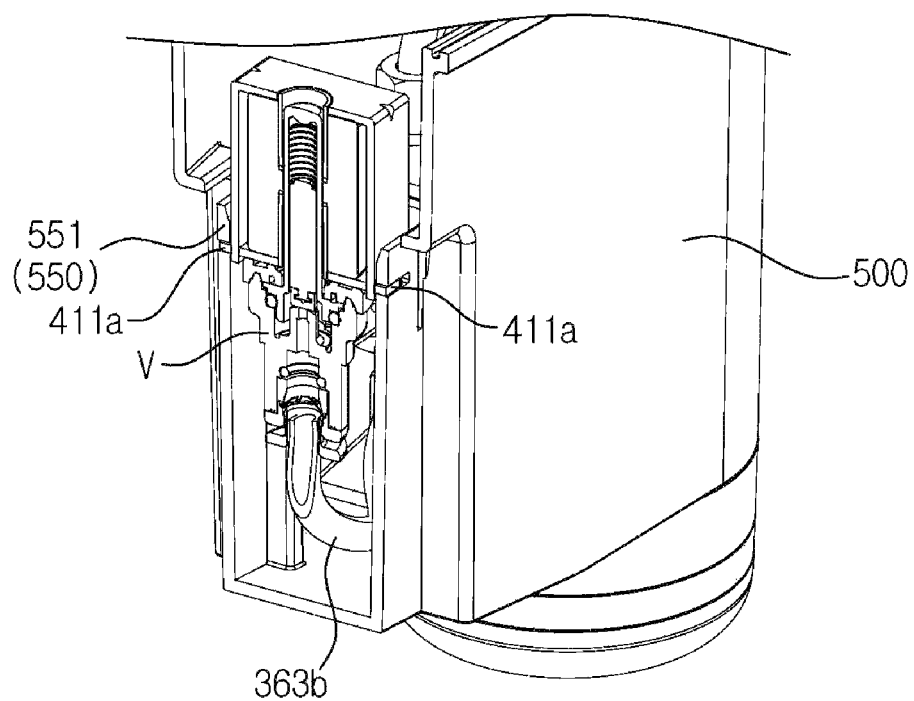
FIG. 9 is a cross-sectional view illustrating a state in which a valve is supported on a holder.
Figure 10:
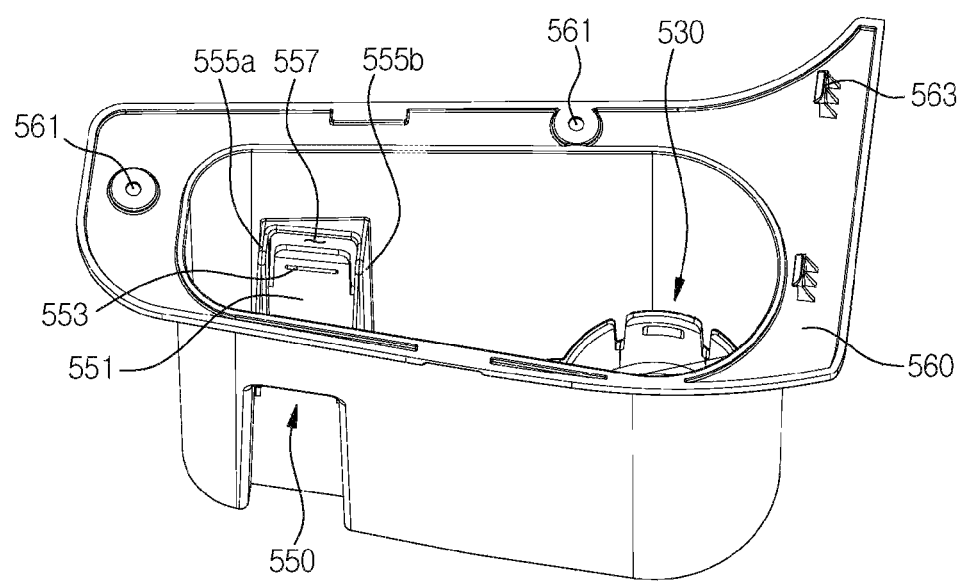
FIG. 10 is a perspective view of a holder.
Figure 11A:
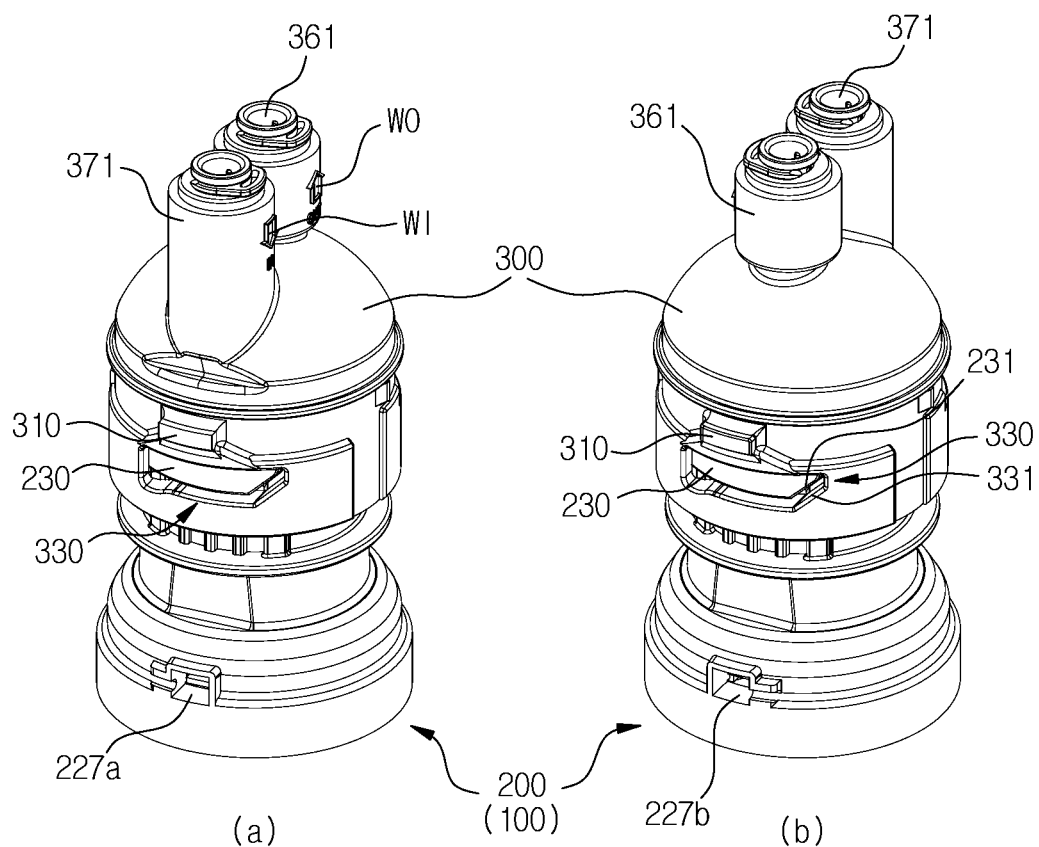
FIG. 11A is a perspective view illustrating both a hydrogen water module and a head.
Figure 11B:
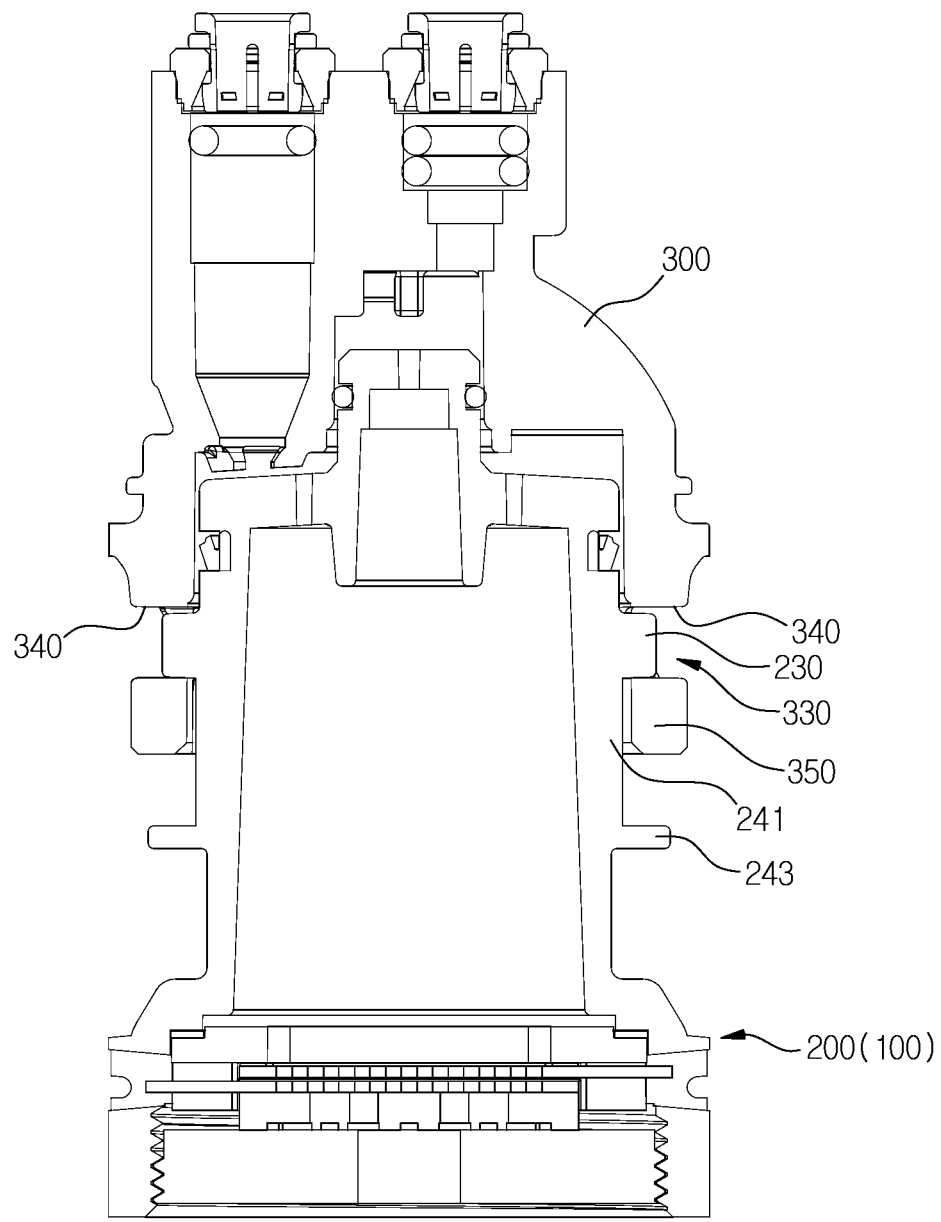
FIG. 11B is a cross-sectional view illustrating an assembled state of a hydrogen water module and a head.
Figure 12:
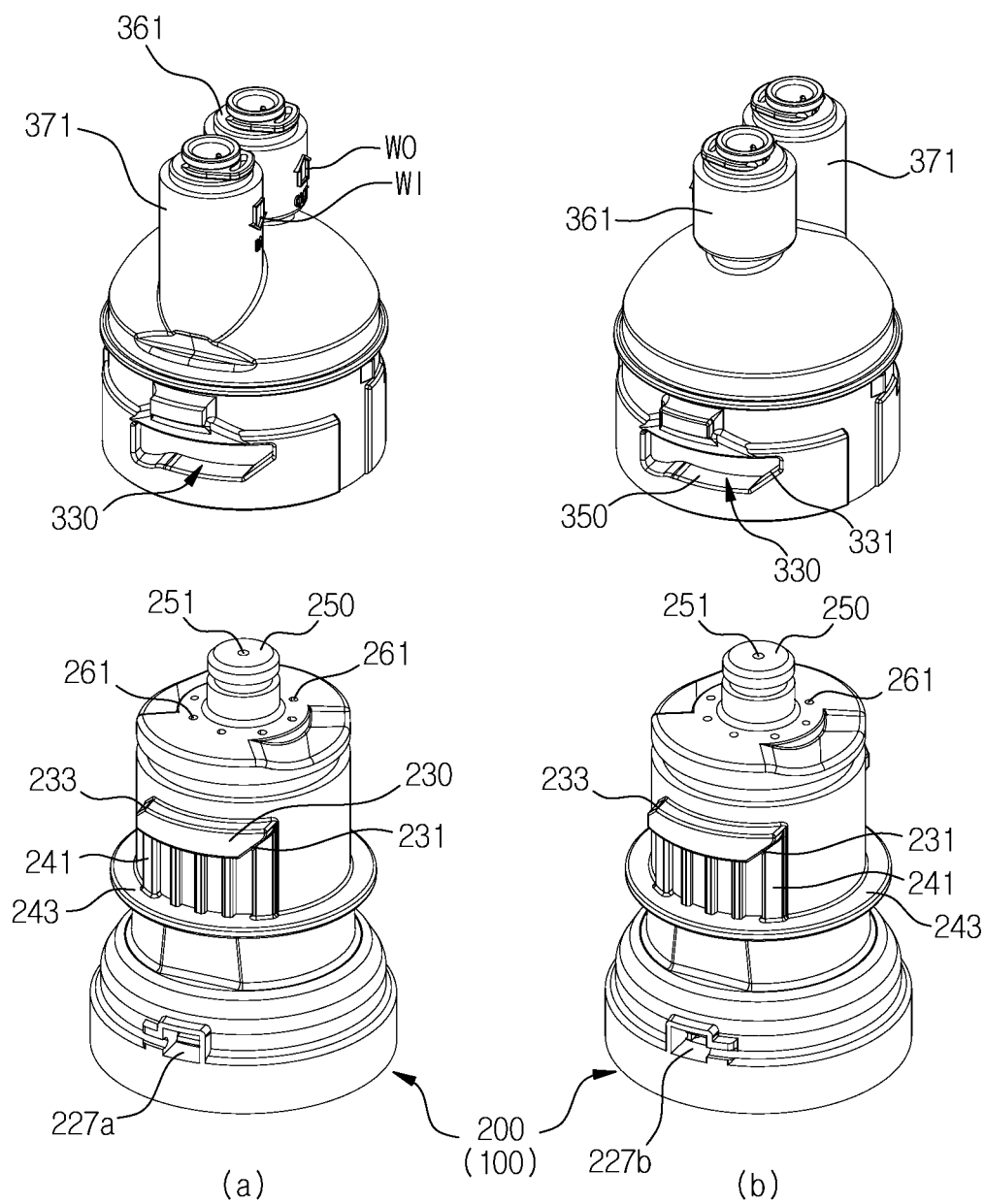
FIG. 12 is an exploded perspective view of a hydrogen water module and a head illustrated in FIG. 11A.
Figure 15:
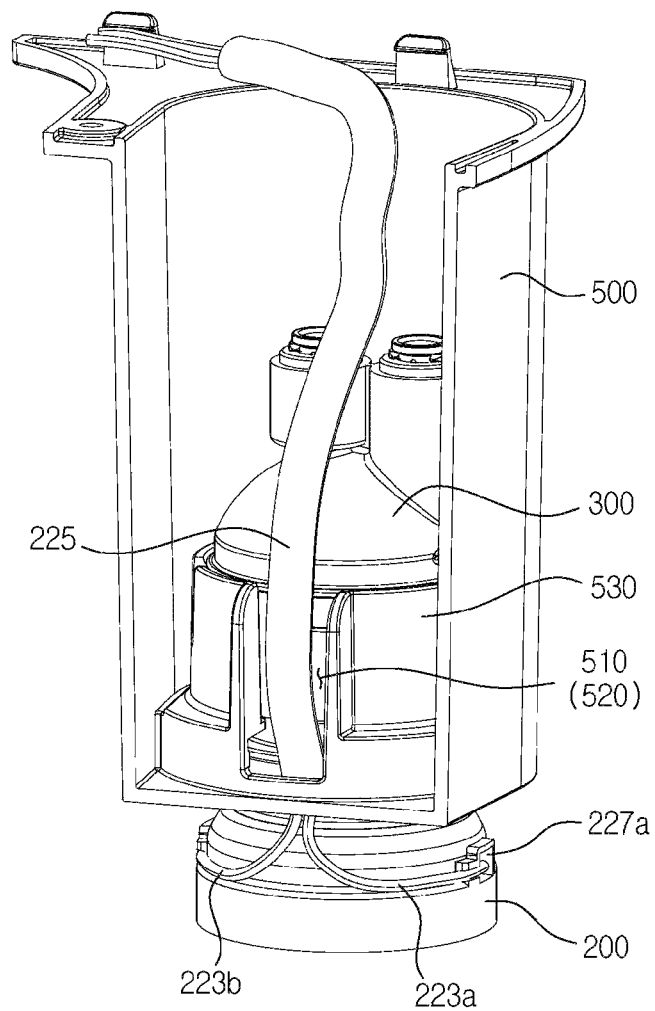
FIG. 15 illustrates a conduit hole and its surroundings.
Figure 16:
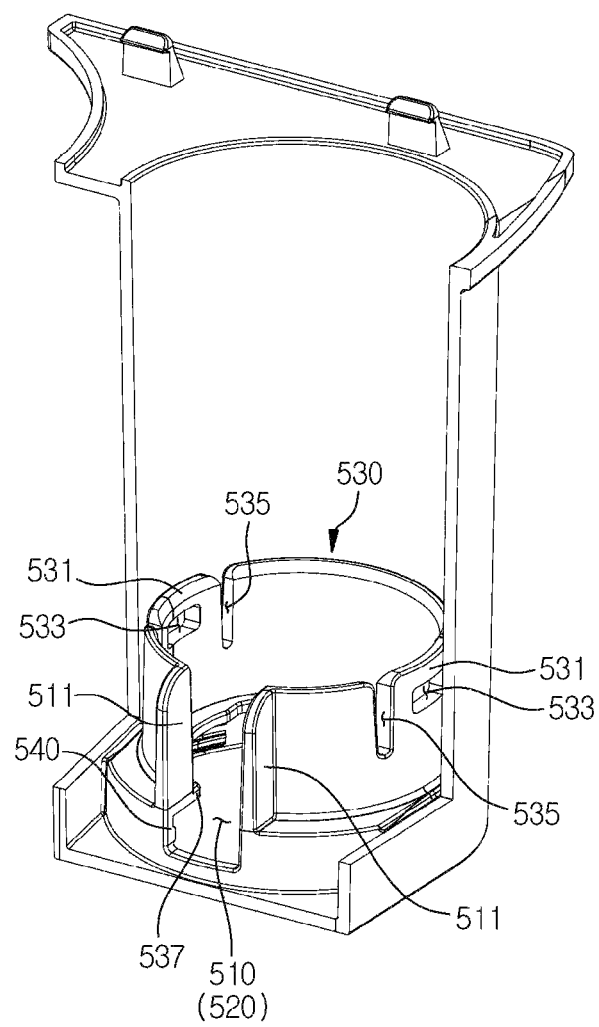
FIG. 16 is a perspective view of a holder so as to illustrate a module accommodation hole.
Figure 17:
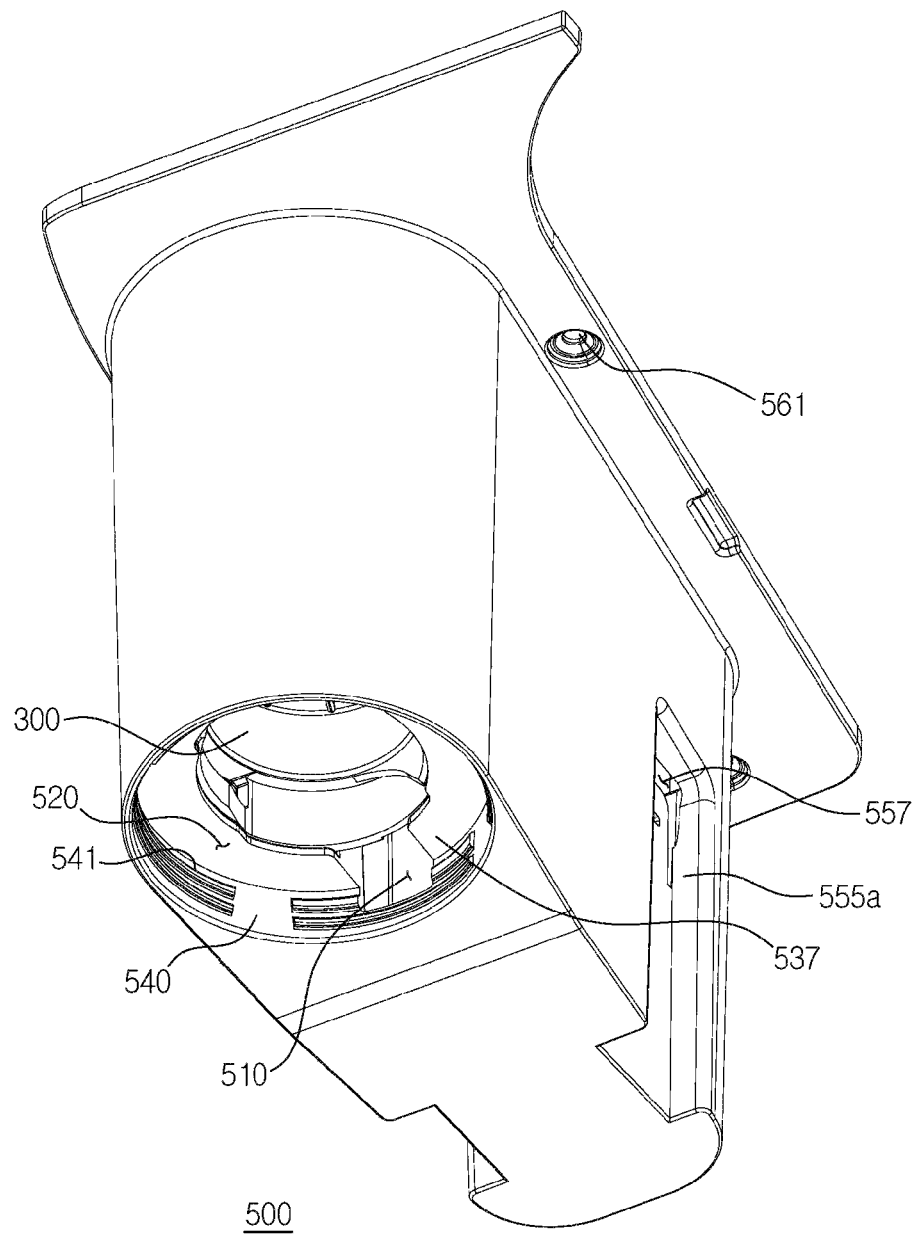
FIG. 17 is a rear perspective view of a holder.
Figure 18:
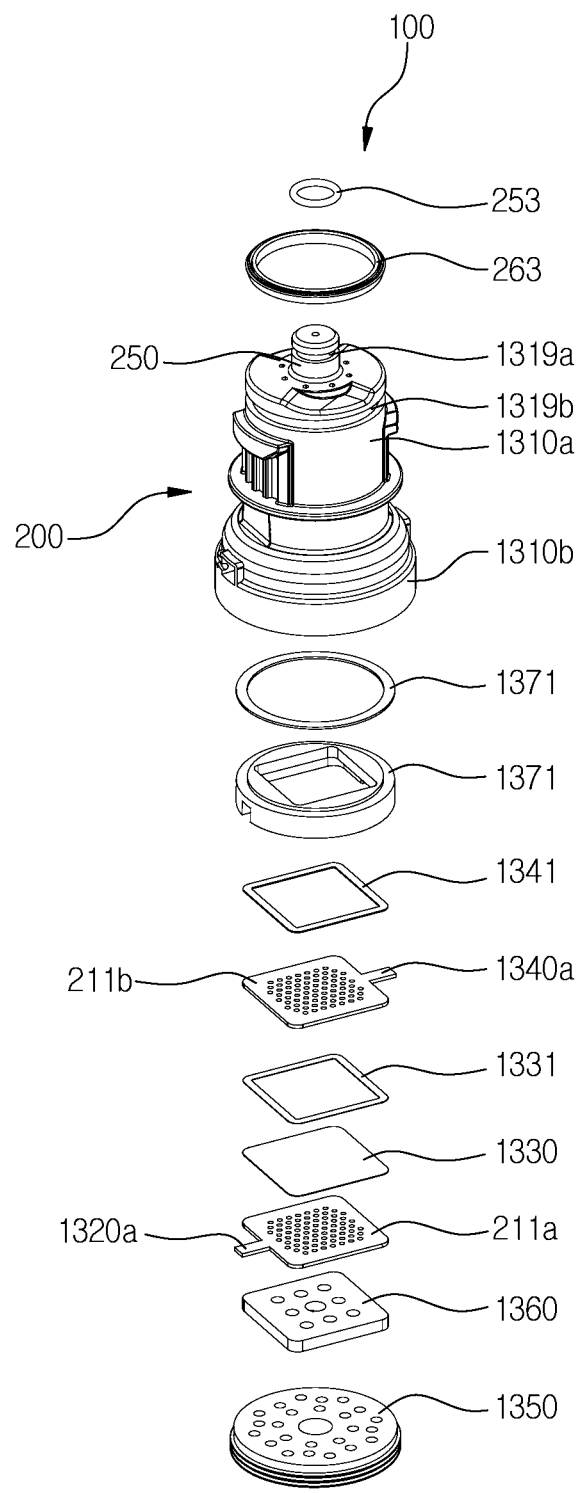
FIG. 18 is an exploded perspective view illustrating a hydrogen water module.
Figure 19:
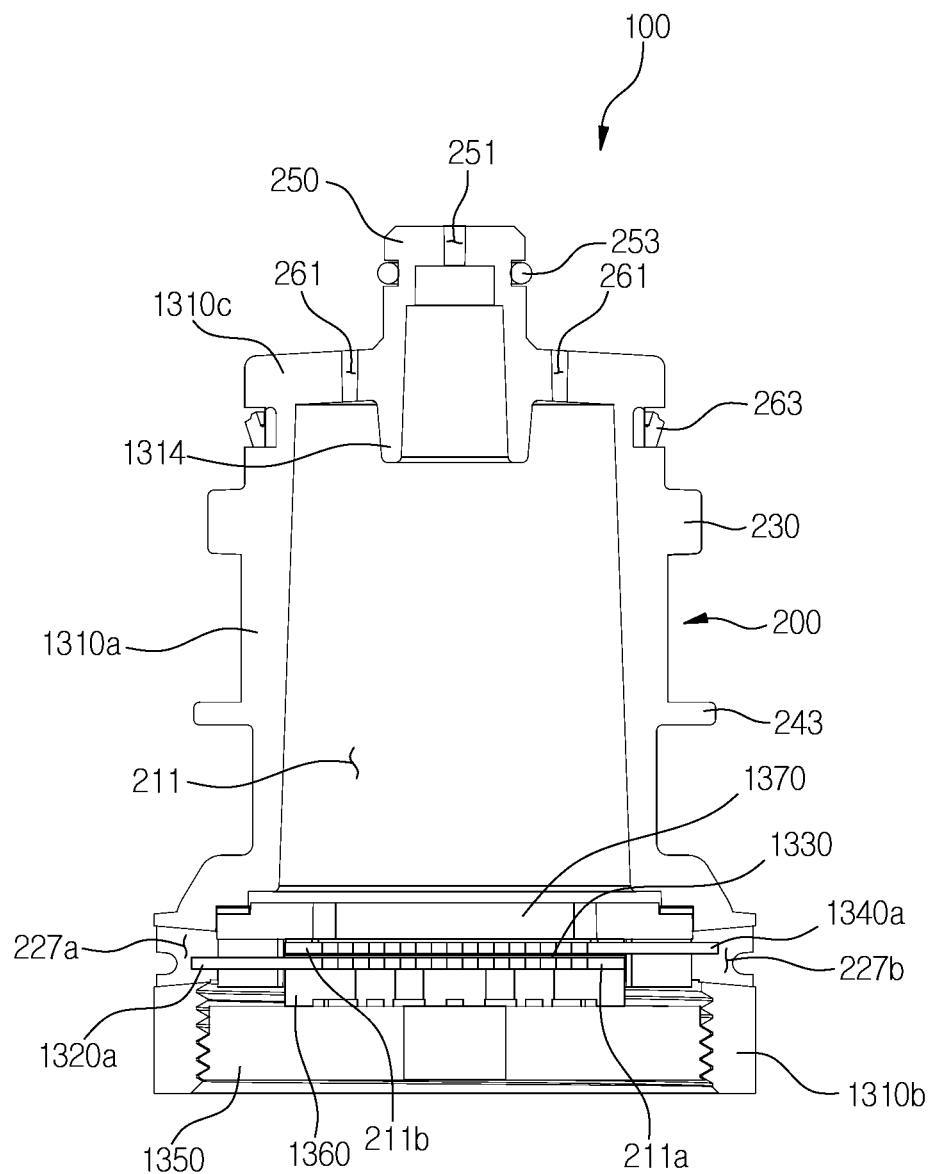
FIG. 19 is a cross-sectional view illustrating a hydrogen water module.

FIG. 1 is a perspective view of a refrigerator according to an embodiment to which the present disclosure is applied. FIG. 2 is a block diagram of a refrigerator according to an embodiment of the present disclosure. FIG. 3A is a rear perspective view of a refrigerator compartment door 13a illustrated in FIG. 1, and FIG. 3B is a rear perspective view of the refrigerator compartment door 13a illustrated in FIG. 1 so as to illustrate an upper space 20 and a side space 30. FIG. 4 is an exploded perspective view of a pocket 700. FIG. 5 is an exploded perspective view of a holder 500 and a hydrogen water module 100. FIG. 6 is an exploded perspective view of the holder 500, the hydrogen water module 100, and a valve V. FIG. 7 is a cross-sectional view illustrating an internal arrangement of the holder 500. FIG. 8 is a perspective view of the valve V and water outlet hoses 363a and 363b. FIG. 9 is a cross-sectional view illustrating a state in which the valve V is supported on the holder 500. FIG. 10 is a perspective view of the holder 500. (a) and (b) in FIG. 11A are perspective views illustrating both the hydrogen water module 100 and a head 300, and FIG. 11B is a cross-sectional view illustrating an assembled state of the hydrogen water module 100 and the head 300. (a) and (b) in FIG. 12 are exploded perspective views of the hydrogen water module 100 and the head 300 illustrated in (a) and (b) of FIG. 11A. FIG. 13(a) is an exploded side view of the hydrogen water module 100 and the head 300, and FIG. 13(b) is a rear view of the head 300. (a) and (b) in FIG. 14 are perspective views of the head 300. FIG. 15 illustrates a conduit hole 510 and its surroundings. FIG. 16 partially illustrates the holder 500 so as to illustrate a module accommodation hole 520. FIG. 17 is a rear perspective view of the holder 500. FIG. 18 is an exploded perspective view illustrating the hydrogen water module 100. FIG. 19 is a cross-sectional view illustrating the hydrogen water module 100.

In FIGS. 3A and 3B, 'A' indicates other side, and 'B' indicates one side.

A cross section of the hydrogen water module 100 in FIG. 7 and a cross section of the hydrogen water module 100 in FIG. 11B are cross sections at different positions.

With reference to the block diagram of FIG. 2, an example of an operation of a refrigerator according to the present disclosure is described as follows.

First, water supplied from a water supply source 50 passes through a filter 60 and is supplied to an ice making chamber 15 and a water supply tank T under the control of a direction switching valve 70. In this instance, when water is supplied to the water supply tank T, water passes through the hydrogen water module 100. If the hydrogen water module 100 does not operate, water may be supplied to the dispenser D as normal water. If the hydrogen water module 100 operates, the water may be converted into hydrogen water and may be supplied to the dispenser D. The supply of water/hydrogen water from the hydrogen water module 100 to the dispenser D may be controlled through the valve V installed between the dispenser D and the hydrogen water module 100.

Unlike FIG. 2, the present disclosure may allow the normal water to be directly supplied to the dispenser D without passing through the hydrogen water module 100.

Hereinafter, a refrigerator according to an embodiment is described based on the drawings.

The refrigerator according to an embodiment may include a refrigerator body 11 having a storage space S; doors 13a, 13b, and 14 provided in the refrigerator body 11 to open and close the storage space S; the water supply tank T provided in the refrigerator body 11 or the doors 13a, 13b, and 14; the holder 500 provided at one side of each of the doors 13a, 13b, and 14; and the hydrogen water module 100 coupled to the holder 500.

The storage space S includes a freezer compartment (not shown) disposed at the lower side of the refrigerator body 11 and a refrigerator compartment (not shown) disposed at upper side of the refrigerator body 11.

The door 13a includes a freezer compartment door 14 for opening and closing the freezer compartment, and refrigerator compartment doors 13a and 13b for opening and closing the refrigerator compartment.

The filter 60 is installed in the refrigerator body 11 or the doors 13a, 13b, and 14.

The filter 60 is configured to filter and purify foreign substances contained in water supplied to the refrigerator from an external water supply source of the refrigerator.

In this embodiment, the filter 60 may be provided at one corner of the refrigerator body 11, and an installation position of the filter 60 may be changed, if necessary or desired.

The water supply tank T may be provided in the refrigerator body 11 or the doors 13a, 13b, and 14.

The water supply tank T is configured to store water purified by the filter 60. The water stored in the water supply tank T may be supplied to the ice making chamber 15 for generating ice, or may be supplied to the hydrogen water module 100 according to an operation of the dispenser D to be described later.

The refrigerator according to an embodiment may include the dispenser D provided at other side of the door 13a; the pocket 700 that is provided at one side of a rear surface of the door 13a and is positioned at the upper side of the dispenser D; a side space 30 surrounded by the pocket 700, one side of the dispenser D, one side of the door 13a, and the lower side of the door 13a; the hydrogen water module 100 coupled to a part of the refrigerator body 11; and the valve V of which both sides are connected to a water outlet port 251 of the hydrogen water module 100 and an outlet port DO of the dispenser D, the valve V being accommodated in the holder 500.

The hydrogen water module 100 may be connected to the water supply tank T and the dispenser D and may be accommodated in the side space 30.

Since the side space 30 is disposed between the dispenser D and one side of the door 13a, an upper side, a lower side, and a rear side of the side space 30 may be opened.

The present disclosure having the above-described configuration can maximize the internal volume of the refrigerator by installing the hydrogen water module 100 and the related components of the hydrogen water module 100, such as the valve V, the water inlet and outlet hoses 363a, 363b, and 373, wires 223a, 223b, and 430, etc., in the pocket 700 and the side space 30 smaller than the upper space 20.

In addition, it is easy to access the side space 30 since the lower side and the rear side of the side space 30 are opened.

Therefore, it is easy to install the holder 500 and replace or check the hydrogen water module 100.

As illustrated in FIG. 3A, in the refrigerator compartment door 13a, the lower side of the holder 500 is spaced apart from the lower side of the door 13a, and an empty space 31 is formed. Thus, since it is easy for the user to access the hydrogen water module 100 through the empty space 31, it is easy for the user to mount and replace the hydrogen water module 100.

In the present disclosure, since the hydrogen water module 100 and the valve V are accommodated in the holder 500 and are not exposed to the outside, they are protected from impact and have good aesthetics.

In this embodiment, the dispenser D is provided at the refrigerator compartment door 13a on the left based on FIG. 1.

More specifically, the dispenser D includes a manipulation unit (not shown) such as a lever, an outlet port DO, an ice passage DI, and the like. Accordingly, the user may take out water of the water supply tank T and hydrogen water or the ice made from the water from the outlet port DO by operating the manipulation unit, if necessary or desired.

The ice passage DI is a passage through which ice of the ice making chamber 15 is taken out to the outlet port DO. As illustrated in FIG. 3A, the ice passage DI is provided at a rear side DB of the dispenser D, i.e., the rear side of the door 13a.

The rear side DB of the dispenser D is provided so that the rear side of the first door 13a protrudes. Accordingly, the upper space 20 and the side space 30 are respectively formed in the upper part and the side part of the rear side DB of the dispenser D at the rear side of the first door 13a.

A width of both sides of the dispenser D is approximately ⅔ of a width of both sides of the door 13a. Therefore, the side space 30 is relatively smaller than the upper space 20, but the internal volume of the refrigerator is maximized by installing the hydrogen water module 100 and the many related components of the hydrogen water module 100 in the side space 30.

The pocket 700 may be accommodated in the upper space 20.

The pocket 700 may be used for the user to store things such as cosmetics.

The hydrogen water module 100, the valve V, and the dispenser D may be positioned at the lower side of the pocket 700. The hydrogen water module 100 may be coupled to the lower part of the pocket 700.

The pocket 700 may include a case 710, a cover 730 that is detachably installed on a lower part inside the case 710, and an installation space 731 that is surrounded by the lower side of the case 710, the cover 730, and a support jaw 713 to be described later.

As illustrated in FIG. 3A, a portion of the front side of the case 710 may be accommodated in a pocket groove 21 formed on one side of the rear surface of the door 13a.

One side and the rear side of the case 710 may be opened.

The case 710 may include a lower case 711 of which a lower side is detachable.

The lower case 711 may have an upper surface that is formed in a concave plate shape.

The support jaw 713 may be formed at an upper edge of the lower case 711.

The cover 730 may be placed on the support jaw 713. Thus, the installation space 731 surrounded by the lower case 711, the support jaw 713, and the cover 730 may be formed.

The cover 730 may also be used for placing things.

As illustrated in FIG. 4, the cover 730 may have a handle (not shown).

Case holes 711a, 711b, and 711c may be formed in the lower case 711 which is the lower side of the case 710.

The case holes 711a, 711b, and 711c are formed by penetrating a lower plate of the lower case 711 up and down.

An upper side and a lower side of each of the case holes 711a, 711b, and 711c communicate with the installation space 731 and an inside 501 of the holder 500, respectively.

A part of the module wires 223a and 223b and at least a part of the hoses 363b and 373 connected to the hydrogen water module 100 may pass through the case holes 711a, 711b, and 711c and may be accommodated in the case 710. More specifically, in this embodiment, at least a part of the module wires 223a and 223b, at least a part of the valve wire 430, and at least a part of a dispenser hose D1 and a tank hose T1 may be accommodated in the installation space 731.

As illustrated in FIG. 4, the case holes 711a, 711b, and 711c may be divided into three holes. Mores specifically, the case holes 711a, 711b, and 711c may include a first hole 711a through which a second water outlet hose 363b, a conduit 225, the module wires 223a and 223b, and a valve wire 430, which will be to be described later, pass; a second hole 711b through which a water inlet hose 373 to be described later passes; and a third hole 711c through which a part of the tank hose T1 and a part of the dispenser hose D1 to be described later pass.

The first hole 711a of the case holes 711a, 711b, and 711c may communicate with the holder 500 coupled to the lower part of the pocket 700.

The module wires 223a and 223b may be connected to an electric wire (not shown) disposed on the door 13a in the installation space 731.

The electric wire (not shown) disposed on the door 13a may also be connected to the valve wire 430 to be described later in the installation space 731.

Since a power source (not shown) is connected to the electric wire (not shown) disposed on the door 13a, the hydrogen water module 100 may operate.

The tank hose T1 may connect the water inlet hose 373 to the water supply tank T. Specifically, the tank hose T1 may be connected to the water supply tank T and may pass through the refrigerator body 11. As illustrated in FIG. 3B, the tank hose T1 may extend to an upper end of the door 13a, may be introduced into the inside of the door 13a, and may extend to the installation space 731. As illustrated in FIG. 4, the tank hose T1 may be connected to the water inlet hose 373 in the installation space 731.

The dispenser hose D1 may connect the second water outlet hose 363b to the dispenser D. Specifically, the dispenser hose D1 may extend from the dispenser D to the lower side of the pocket 700 and extend to the installation space 731 through the third hole 711c. As illustrated in FIG. 4, the dispenser hose D1 may be connected to the second water outlet hose 363b in the installation space 731.

As described above, since the pocket 700 can accommodate the components related to the hydrogen water module 100 using the case holes 711a, 711b, and 711c, the pocket 700 is useful in addition to accommodating things.

In addition, since the components related to the hydrogen water module 100 are covered by the pocket 700 and the holder 500 and are not exposed to the outside, there is little risk of damage.

A case door 720 may be rotatably installed at the other side of the case 710 to open and close a part of the opened one side and the opened rear side of the case 710.

The present disclosure further includes the holder 500 that is accommodated in the side space 30 and is installed on the lower side of the pocket 700.

The holder 500 may be positioned on the side of the dispenser D. In addition, the holder 500 may be installed between the pocket 700 and the hydrogen water module 100. Thus, since the hydrogen water module 100 and the valve V accommodated in the holder 500 are positioned on the side of the dispenser D, they are very close to the outlet port DO. Hence, this maximizes the efficiency of the hydrogen water module 100 because the user can drink hydrogen water with high solubility.

The holder 500 includes the module accommodation hole 520 having an opened lower side, and the hydrogen water module 100 is accommodated in the module accommodation hole 520.

Specifically, the module accommodation hole 520 is formed in a shape corresponding to an outer shape of the hydrogen water module 100 on the rear lower surface of the holder 500.

The upper side of the module accommodation hole 520 communicates with the inside 501 of the holder 500, and the lower side of the module accommodation hole 520 communicates with the outside of the holder 500.

The hydrogen water module 100 may be accommodated in the module accommodation hole 520, and the upper side that is at least a part of the hydrogen water module 100 may be positioned in the inside 501 of the holder 500. The lower side that is the remaining part of the hydrogen water module 100 may be positioned below than the module accommodation hole 520 and may protrude to the outside of the holder 500.

The refrigerator according to the present disclosure may further include a cap 600 in which the lower side of the hydrogen water module 100 protruding to the outside of the holder 500 is accommodated. Therefore, when the cap 600 is separated from the holder 500, the lower part of the hydrogen water module 100 is exposed, and thus it is easy to separate, check, and replace the hydrogen water module 100.

The hydrogen water module 100 is protected by the holder 500 and the cap 600, and thus is less likely to be damaged.

The cap 600 may be detachably installed in the holder 500.

A cap installation portion 540, in which the cap 600 is installed, may be formed at the lower side of the holder 500.

A female screw 541 may be formed on an inner peripheral surface of the cap installation portion 540.

A male screw 641 fastened to the female screw 541 may be formed on an outer peripheral surface of the cap 600. Thus, when the cap 600 is fastened to the cap installation portion 540, the cap 600 may be fixed to the holder 500.

As illustrated in FIGS. 7, 10, 15, and 16, the holder 500 includes a module support wall 530 that forms a part of the module accommodation hole 520.

The module support wall 530 has a pipe shape.

First catching grooves 533 are formed on both sides of the module support wall 530.

First protrusions 310 inserted into the first catching grooves 533 are formed on both sides of the head 300. Therefore, the head 300 can be assembled through a simple configuration in which the first protrusion 310 is inserted into the first catching groove 533 of the holder 500. Hence, the head 300 can be supported by the holder 500 so that it does not move up, down, left and right.

The hydrogen water module 100 includes a module body 200 accommodated in the module accommodation hole 520.

The module body 200 has a space 211 in which electrode members 211a and 211b are accommodated therein.

The head 300 is connected to the water supply tank T by the water inlet hose 373 and is connected to the dispenser D by the water outlet hoses 363a and 363b.

As illustrated in FIGS. 11A and 12, the first protrusions 310 are formed on both sides of the head 300, respectively.

As illustrated in FIG. 16, the first catching groove 533 is formed by penetrating each of both sides of the module support wall 530.

Catching pieces 531, in which the first catching groove 533 is formed, are formed on both sides of the module support wall 530, and first cut portions 535 are formed on both sides of the catching piece 531.

The catching piece 531 may be spread outward by the first cut portion 535. Therefore, when the head 300 is pushed from the lower side to the upper side of the module support wall 530, the catching piece 531 contacting the first protrusion 310 is spread outward, the first protrusion 310 is inserted into the first catching groove 533, the spread catching piece 531 is returned to its original state, and the head 300 and the holder 500 are coupled. Hence, the head 300 and the holder 500 can be easily coupled by the first protrusion 310 and the first catching groove 533. In addition, it is convenient because no tool is required when the head 300 is coupled and separated.

As illustrated in FIGS. 7, 16, and 17, the holder 500 includes a head support piece 537 on which the head 300 can be supported.

The head support piece 537 may serve to limit an entry distance of the head 300.

The head support piece 537 forms the module accommodation hole 520 together with the cap installation portion 540 and the module support wall 530.

The head support piece 537 may be connected to the rear inner surface of the holder 500.

The head support piece 537 may be connected to the upper end of the cap installation portion 540.

The module support wall 530 is formed to protrude upward at one point of the head support piece 537. Accordingly, the module support wall 530 is spaced apart from the inner surface of the holder 500 by a predetermined distance.

The head support piece 537 has a circular band shape, and the front center of the head support piece 537 may be cut as illustrated in FIGS. 16 and 17.

As illustrated in FIGS. 15 to 17, the module accommodation hole 520 includes a conduit hole 510 through which the conduit 225 accommodating the module wires 223a and 223b passes. Thus, since the module wires 223a and 223b are positioned in the conduit hole 510, they are not greatly shaken and may be stably connected to the hydrogen water module 100.

The conduit hole 510 may be formed by the module support wall 530, the head support piece 537, and the cap installation portion 540. Specifically, shielding pieces 511 are formed on both sides of the center of the cut front side of the module support wall 530. The shielding piece 511 may be connected to the module support wall 530 and the head support piece 537. Therefore, the conduit hole 510 may be formed by a space between the shielding pieces 511 on its both sides, the cut front center of the head support piece 537, and the cut front center of the cap installation portion 540 to be described later.

As illustrated in FIGS. 7 and 9, the valve V may be accommodated in the front of the inside 501 of the holder 500.

As illustrated in FIG. 8, the valve wire 430 for the operation may be connected to the valve V.

The valve V may include a valve inlet 410 communicating with the hydrogen water module 100, and a valve outlet 420 communicating with the valve inlet 410 and the dispenser D. The valve outlet 420 may be integrally formed with the valve inlet 410.

The present disclosure may further include a bracket 411 coupled to the valve V. Specifically, the bracket 411 is coupled to both the valve inlet 410 and the valve outlet 420.

The bracket 411 includes a protective body 421 surrounding the upper part and both sides of the valve outlet 420.

The bracket 411 may be supported on the holder 500. To this end, second protrusions 411a are formed on both sides of the bracket 411, respectively.

As illustrated in FIG. 8, the second protrusion 411a is positioned on the outside of both sides of the valve inlet 410 and both sides of the protective body 421.

A valve support portion 550 on which the bracket 411 is supported is formed inside the holder 500. Specifically, the valve support portion 550 is formed to protrude inward from both sides of the holder 500.

A second catching groove 553 into which the second protrusion 411a is inserted is formed in the valve support portion 550.

The second catching groove 553 is formed by penetrating both sides of the valve support portion 550.

Through the configuration described above, the valve V and the holder 500 can contact each other at least. Specifically, only the second protrusion 411a in the valve V may contact the valve support portion 550 of the holder 500.

Hence, the valve V can be assembled through simple configuration in which the second protrusion 411a is inserted into the second catching groove 553 of the holder 500. Accordingly, the valve V may be supported on the holder 500 so that it does not move up, down, left and right.

The valve support portion 550 may include a valve support piece 551 in which the second catching groove 553 is formed, and connection pieces 555a and 555b connected to the front and rear sides of the valve support piece 551 and the inner surface of the holder 500.

The connection pieces 555a and 555b may include a front connection piece 555a connected to the front side of the valve support piece 551, and a rear connection piece 555b connected to the rear side of the valve support piece 551.

The holder 500 may include a second cut portion 557 surrounding the upper side of the valve support piece 551.

As illustrated in FIGS. 10 and 17, the second cut portion 557 may be formed by cutting a portion of both plates of the holder 500 and cutting between the connection pieces 555a and 555b and the valve support piece 551.

The upper side of the valve support piece 551 and the upper side of the connection pieces 555a and 555b may be spaced apart from each other by the second cut portion 557. Thus, the upper side of the valve support piece 551 may have a cantilever shape.

The valve outlet 420 is positioned between the valve support portions 550 on its both sides. That is, the valve outlet 420 may be disposed on the front side of the holder 500.

The valve inlet 410 is positioned between the valve support portion 550 and the hydrogen water module 100. That is, the valve inlet 410 may be disposed approximately at the center of the holder 500.

The module body 200 may include a body 210 forming a space 211 in which the electrode members 211a and 211b and water/hydrogen water can be accommodated, and a water outlet portion 250 that protrudes from the upper side of the body 210 and communicates with the body 210.

The body 210 may have a cylindrical shape in which a diameter decreases as it goes to the upper side.

A lower part of the body 210 is open.

The electrode members 211a and 211b may be disposed at the lower part of the body 210. The electrode members 211a and 211b may include a negative (−) electrode member 211a and a positive (+) electrode member 211b.

The electrode members 211a and 211b may be connected to the module wires 223a and 223b. Specifically, the module wires 223a and 223b may include a negative (−) wire 223a connected to the negative (−) electrode member 211a and a positive (+) wire 223b connected to the positive (+) electrode member 211b.

A negative (−) wire hole 227a and a positive (+) wire hole 227b, through which the negative (−) wire 223a and the positive (+) wire 223b pass respectively, may be formed at the lower part of the body 210.

The negative (−) wire 223a and the positive (+) wire 223b disposed outside the body 210 may be accommodated in the conduit 225.

As illustrated in FIG. 15, through the configuration described above, the module wires 223a and 223b may be accommodated in the installation space 731 via the negative (−) wire hole 227a and the positive (+) wire hole 227b, the inside of the cap 600, the conduit hole 510, and the inside 501 of the holder 500. Therefore, the module wires 223a and 223b may not be exposed to the outside.

In the upper part of the body 210, a water outlet port 251 and a radial water inlet port 261 around the water outlet port 251 may be formed.

The water inlet port 261 is a passage through which water of the water supply tank T is introduced into the space 211 of the body 210.

The water outlet port 251 communicates with the space 211 of the body 210 and is a passage through which hydrogen water produced in the space 211 of the body 210 is discharged.

The water outlet port 251 may be formed in the water outlet portion 250 protruding upward from the upper side of the body 210.

Specifically, the water outlet port 251 may be formed in the center of the upper side of the body 210.

A part of the hoses 363a and 373 connected to the hydrogen water module 100 may be accommodated in the holder 500 and the installation space 731.

As illustrated in FIG. 4, the hoses 363a and 373 include a second water outlet hose 363b communicating with the water outlet port 251 and include a water inlet hose 373 communicating with the water inlet port 261.

The water inlet hose 373 and the water outlet hose 363a and 363b may be connected to the head 300.

The lower part of the head 300 is opened so that the module body 200 can be inserted into the head 300.

The upper part of the head 300 may be formed in a dome shape.

The head 300 may include an insertion portion 360 into which the water outlet portion 250 is inserted. The insertion portion 360 may be formed to protrude downward from the upper inner surface of the head 300. Accordingly, the insertion portion 360 may guide an assembly position of the module body 200 and the head 300 together with the water outlet portion 250.

A passage 201 through which water introduced into the water inlet port 261 of the hydrogen water module 100 passes may be formed. Specifically, the passage 201 may be surrounded by the upper part of the head 300, the insertion portion 360, the water outlet portion 250, and the upper part of the body 210.

The upper part of the head 300 may be formed such that a water outlet hose connection pipe 361 and a water inlet hose connection pipe 371 each protrude upward.

The water outlet hose connection pipe 361 may be formed in the vicinity of the center of the upper part of the head 300.

The water inlet hose connection pipe 371 may be formed on the side of the water outlet hose connection pipe 361. That is, the water inlet hose connection pipe 371 may be formed at a point on the side of the upper part of the head 300.

As illustrated in FIG. 12, arrows WO and WI of a shape corresponding to a flow direction of water/hydrogen water may be formed in the water outlet hose connection pipe 361 and the water inlet hose connection pipe 371. Therefore, the water outlet hoses 363a and 363b and the water inlet hose 373 can be easily connected.

The water outlet hoses 363a and 363b may include a first water outlet hose 363a connected to the upper side of the water outlet hose connection pipe 361 and the upper side of the valve inlet 410, and a second water outlet hose 363b connected to the lower side of the valve outlet 420 and the dispenser D.

Through the above-described structure, the water in the water supply tank T may be introduced into the body 210 via the water inlet hose 373, the passage, and the water inlet port 261. After the introduced water is electrolyzed by the electrode members 211a and 211b and is generated into hydrogen water, the hydrogen water may be provided to the user via the water outlet port 251, the water outlet hose 363a and 363b, the valve V, and the outlet port DO of the dispenser D.

As illustrated in FIG. 6, the holder 500 may include a top plate 560.

The holder 500 may be supported on the case 710 through the upper plate 560.

The upper plate 560 is formed to extend outward from the perimeter of the upper end of the holder 500.

A plurality of fastening holes 561 and hooks 563 may be formed in the upper plate 560.

For example, after supporting the holder 500 and the case 710 by hooking the hooks 563 to grooves (not shown) of the case 710, bolts are integrally fastened to the fastening holes 561 and the case 710. Hence, the holder 500 and the case 710 can be more firmly supported.

A rotation bar 18 may be installed on the side of the door 13a.

The rotation bar 18 can prevent a cold air from leaking in a gap between both doors 13a at the side of the pocket 700 and the holder 500. Hence, the holder 500 can be protected from external impact by being surrounded by the rotation bar 18, the side of the door 13a in which the rotation bar 18 is installed, the pocket 700, and the dispenser D.

As illustrated in FIG. 13(a), the body 210 may include a plurality of reinforcing ribs 241 connected to a catching portion 230.

The reinforcing ribs 241 may be formed on both sides of an outer peripheral surface of the body 210 like the catching portion 230.

The reinforcing rib 241 may be formed such that a vertical length is longer than a width.

The reinforcing rib 241 may be connected to a lower end of the catching portion 230 and an upper end of a band-shaped rib 243.

The band-shaped rib 243 may be formed to protrude from the center of the outer peripheral surface of the body 210.

A first packing 253 may be positioned between the water outlet portion 250 and the insertion portion 360.

A first fitting groove 1319a is formed in an outer peripheral surface of the water outlet portion 250, and the first packing 253 is fitted to the first fitting groove 1319a.

The inner side and the outer side of the first packing 253 may contact the water outlet portion 250 and the insertion portion 360, respectively. Thus, a water leakage between the water outlet portion 250 and the insertion portion 360 can be prevented.

Further, a second packing 263 may be positioned between the body 210 and the head 300.

More specifically, as illustrated in FIGS. 13(a) and 18, a second fitting groove 1319b in which the second packing 263 is installed may be formed on the upper side of the body 210.

The inner side and the outer side of the second packing 263 may contact the body 210 and the head 300, respectively. Thus, a water leakage between the body 210 and the head 300 can be prevented.

The present disclosure can prevent a water leakage between the hydrogen water module 100 and the head 300 by the first packing 253 and the second packing 263.

A diaphragm 1330 (see FIGS. 18 and 19) may be disposed between the negative electrode member 211a and the positive electrode member 211b.

The design such as printing and plating may be added to the cap 600.

Description for the Assembly of the Module Body 200 and the Head 300

An assembly guide portion 320 connected to a caught portion 330 may be formed at the lower side of an inner peripheral surface of the head 300.

Figure 13:
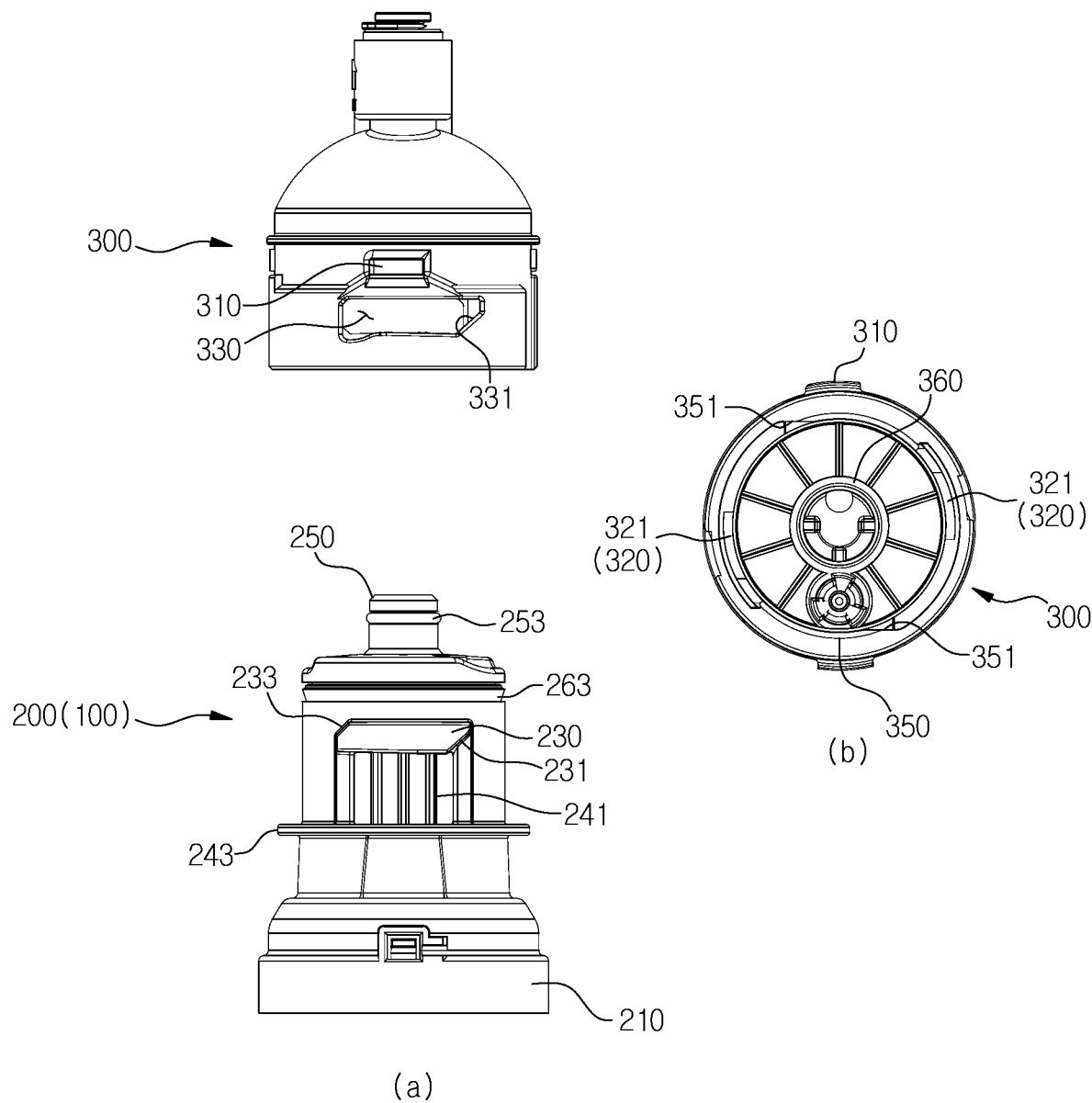
FIG. 13 illustrates an exploded side view of a hydrogen water module and a head and a rear view of the head.
Figure 14:
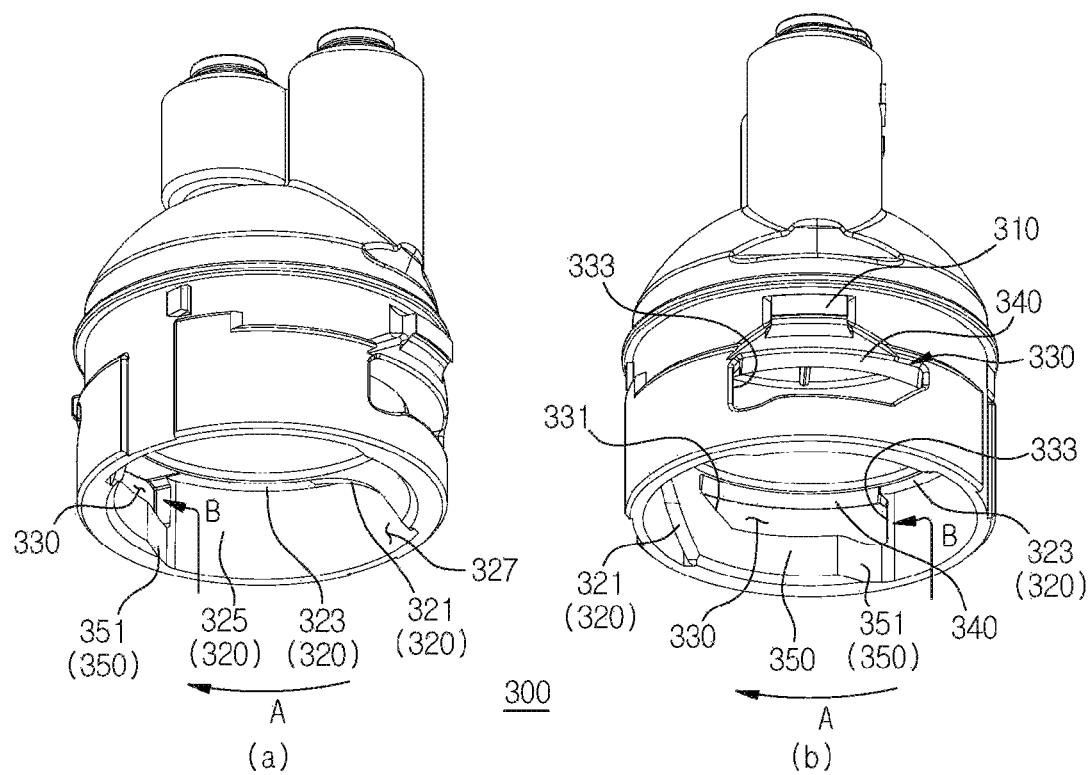
FIG. 14 is a perspective view of a head.

As illustrated in FIGS. 12 to 14, in the head 300, the caught portions 330 may be formed on both sides of the assembly guide portion 320.

The module body 200 may include the catching portion 230 corresponding to the assembly guide portion 320.

As illustrated in FIG. 11B, the catching portion 230 may be assembled, i.e., inserted into the caught portion 330 when the hydrogen water module 100 and the head 300 are assembled.

In the hydrogen water module 100 according to the present disclosure having the above-described configuration, when the module body 200 is inserted into the head 300 and then rotates as indicated by an arrow 'B' of FIG. 14, the catching portion 230 may be inserted into the caught portion 330 to complete the assembly of the module body 200 and the head 300 as illustrated in FIG. 11B.

As described above, in the hydrogen water module 100 according to the present disclosure, since the module body 200 and the head 300 can be assembled/separated only by arranging a position at which the module body 200 is to be assembled and rotating the module body 200, even the non-expert user can easily replace the module body 200.

In addition, since no tool is required when replacing the module body 200, assembly and serviceability such as replacement are improved. Accordingly, the electrode members 211a and 211b and the diaphragm 1330 (see FIGS. 18 and 19) with scale can be easily replaced, and as a result, hydrogen water with a high dissolved amount can be supplied.

As illustrated in FIGS. 11A and 12, the assembly guide portion 320 and the caught portion 330 may be formed one by one on both sides of the head 300. In addition, the catching portions 230 may be formed one by one on both sides of the outer peripheral surface of the module body 200 so that the catching portion 230 is assembled to the caught portion 330. Thus, the assembly between the head 300 and the module body 200 can be improved, and when assembled, the movement from left and right can be prevented, and the assembly can be firmly maintained.

The catching portion 230 may be formed to protrude between the upper end and the center of the outer peripheral surface of the body 210.

Based on FIG. 13, a lower right side of the catching portion 230 may be formed as a first inclined surface 231. Also, an upper left side of the catching portion 230 may be formed as a second inclined surface 232.

When the hydrogen water module 100 and the head 300 are assembled, the first inclined surface 231 is assembled with the head 300 before the second inclined surface 232.

As illustrated in FIG. 14, the first inclined surface 231 and the second inclined surface 232 may be inclined upward as they go toward the assembly direction (arrow 'A' in FIG. 14).

As illustrated in FIGS. 13 and 14, the assembly guide portion 320 may include a first assembly guide surface 321, a first stopper 323, and a guide inner surface 325.

The first assembly guide surface 321 may be connected to the lower end of the head 300.

The first assembly guide surface 321 may be formed as a curved surface inclined toward the caught portion 330 as it goes to the upper side. Thus, the first assembly guide surface 321 which is at least a part of the assembly guide portion 320 may be formed spirally. In this case, the first assembly guide surface 321 may be formed spirally with respect to a central axis of the head 300.

When the hydrogen water module 100 and the head 300 are assembled, the second inclined surface 232 is in contact with the first assembly guide surface 321, and thus the module body 200 can easily rotate.

The first stopper 323 may have a shape protruding from the inner peripheral surface of the head 300. Further, the first stopper 323 may have a shape corresponding to the inner peripheral surface of the head 300.

The guide inner surface 325 may be connected to the upper side of the first assembly guide surface 321 and the first stopper 323 of the caught portion 330.

The guide inner surface 325 may form a portion of the inner peripheral surface of the head 300.

The guide inner surface 325 may be positioned on the side of the caught portion 330. Based on FIG. 14(a), the guide inner surface 325 may be positioned on the right side of the caught portion 330.

As illustrated in FIG. 14(a), a concave portion 327 may be formed on the inner peripheral surface of the head 300 by the assembly guide portion 320.

The head 300 may include a protruding support portion 350 on which the catching portion 230 is supported. More specifically, as illustrated in FIG. 11B, the catching portion 230 inserted into the caught portion 330 may be supported on an upper surface of the protruding support portion 350. Thus, the upper surface of the protruding support portion 350 may form a part of the caught portion 330.

The protruding support portion 350 may be formed to protrude from the inner peripheral surface of the head 300.

Based on FIG. 14, the right side of the protruding support portion 350 may be formed of a second assembly guide portion 351.

Based on FIG. 14, the second assembly guide portion 351 may be positioned on the left side of the guide inner surface 325.

The second assembly guide portion 351 may be formed to be inclined inward as it goes toward the direction of the arrow 'A' of FIG. 14, i.e., the assembly direction of the module body 200. That is, a thickness of the second assembling guide portion 351 may increase as it goes toward the assembly direction of the module body 200.

As illustrated in FIGS. 12 to 14, the caught portion 330 may be formed between the first protrusion 310 and the lower end of the head 300.

The caught portion 330 may be formed by penetrating laterally the head 300.

As illustrated in FIG. 14, the caught portion 330 may include an upper surface of the protruding support portion 350, a second stopper 340 spaced apart from the upper side of the protruding support portion 350, an inclined surface 331 connected to the side of the protruding support portion 350, and a side surface 333 that is connected to the side of the second stopper 340 and is positioned on the opposite side of the inclined surface 331.

The upper surface of the protruding support portion 350 and the second stopper 340 may be formed in parallel with each other. In addition, the upper surface and the lower surface of the catching portion 230 may be formed in parallel with each other to correspond to them. Thus, the assembly of the hydrogen water module 100 and the head 300 can be stably maintained.

The second stopper 340 may be connected to the first stopper 323 to guide the movement of the catching portion 230.

The second stopper 340 may have a shape corresponding to the first stopper 323.

For the stable assembly of the module body 200 and the head 300, the inclined surface 331 of the caught portion 330 may have a shape corresponding to the first inclined surface 231 of the catching portion 230.

The side surface 333 of the caught portion 330 may be formed in the up-down direction.

As illustrated in FIG. 13(a), when viewed from the side of the hydrogen water module 100 and the head 300, a lateral length of the caught portion 330 may be less than a lateral length of the catching portion 230.

An example of an assembly method of the module body 200 and the head 300 is described below.

First, the module body 200 is inserted upward into the lower side of the head 300. In this case, the catching portion 230 is inserted into the lower side of the assembly guide portion 320, i.e., the concave portion 327.

Next, the module body 200 rotates in the assembly direction (arrow 'A' direction in FIG. 14) until the catching portion 230 is caught by the first and second stoppers 323 and 340 and the catching portion 230 and the caught portion 330 are positioned at the sides of each other. In this process, since the first inclined surface 231 may contact the second assembly guide portion 351 and the second inclined surface 232 may contact the first assembly guide surface 321, the module body 200 can easier rotate spirally.

Next, when the module body 200 further rotates, a part of the catching portion 230 is inserted into the caught portion 330, and the assembly of the module body 200 and the head 300 can be completed.

When the assembly of the module body 200 and the head 300 is completed as described above, the catching portion 230 may be supported on the upper surface of the protruding support portion 350. Further, only a portion of the catching portion 230 may be inserted into the caught portion 330, and the rest of the catching portion 230 may be accommodated in the concave portion 327 formed by the assembly guide portion 320. The rest of the catching portion 230 indicates a part of the left side including the second inclined surface 232 based on FIG. 12, and is accommodated in the concave portion 327 and is not exposed to the outside as illustrated in FIG. 11A.

The hydrogen water module 100 is mounted on the holder 500 coupled to the rear side of the refrigerator compartment door 13a, i.e., the rear side of the refrigerator compartment door 13a.

Referring to FIGS. 5 and 17, the hydrogen water module 100 is mounted on the holder 500 such that it is accommodated in the module accommodation hole 520 formed in the holder 500 from the lower side to the upper side, i.e., in the vertical direction and is caught and coupled to the head 300 through rotation.

The hydrogen water module 100 has the water inlet port 261 connected to the water supply tank T and the water outlet port 251 connected to the dispenser D.

In this instance, the water outlet port 251 and the water inlet port 261 are formed at the upper part of the hydrogen water module 100, and the water outlet port 251 is positioned above than the water inlet port 261.

Referring to FIGS. 18 and 19, the hydrogen water module 100 may include the module body 200, the electrode members 211a and 211b, the diaphragm 1330, a locking member 1350, a pressing plate 1360, and a guide 1370.

The module body 200 is a component forming an outer shape of the hydrogen water module 100, and includes an inner space 211 in which water is accommodated, and an opening at the lower part.

In an upper plate 1310c of the module body 200, the water inlet port 261, that allows water to be introduced into the space 211, is vertically penetratingly formed, and the water outlet portion 250, that protrudes upward and has the space 211 therein, is formed at the center of the upper plate 1310c. The water outlet port 251 is vertically penetratingly formed at the upper end of the water outlet portion 250 so that hydrogen water produced by electrolyzing water accommodated in the space 211 can be discharged to the outside of the module body 200.

That is, the water outlet port 251 is formed in the vertical direction to face up and down the space 211 that is the inside of the hydrogen water module 100.

Since the water outlet port 251 is formed at the upper end of the water outlet portion 250 positioned above than the upper plate 1310c, the water outlet port 251 may be positioned above than the water inlet port 261 formed in the upper plate 1310c.

The water outlet port 251 is formed at the center of the upper end of the water outlet portion 250, and the plurality of water inlet ports 261 are formed in the upper plate 1310c so that they are radially disposed around the water outlet port 251.

A blocking rib 1314 may be formed on the lower surface of the upper plate 1310c in the form that the blocking rib 1314 is surrounded by the plurality of water inlet ports 261.

The blocking rib 1314 is formed to protrude downward from the lower surface of the upper plate and is formed to extend below than the lower end of the water inlet port 261. More specifically, the blocking rib 1314 is formed to extend downward from the lower edge of the water outlet portion 250 and is formed in the form of a circular ring.

It is preferable that an outer diameter of the blocking rib 1314 is less than the diameter of a circle connecting the plurality of water inlet ports 261. It is preferable that the blocking rib 1314 is positioned inside the plurality of water inlet ports 261.

A shape of the blocking rib 1314 may be formed in a polygon in addition to a circle.

A lower end of the blocking rib 1314 is positioned below than the lower end of the water inlet port 261.

The blocking rib 1314 can effectively prevent water entering the space 211 through the water inlet port 261 from being discharged directly to the water outlet port 251 without electrolysis using the electrode members 211a and 211b. The blocking rib 1314 can also guide water entering the space 211 through the water inlet port 261 to flow more stably and accurately to the electrode members 211a and 211b.

The module body 200 may include a small diameter portion 1310a at the upper side and a large diameter portion 1310b at the lower side.

The small diameter portion 1310a is a portion in which water introduced from the water inlet port 261 is accommodated, and has a cylindrical shape as a whole. The upper plate 1310c of the small diameter portion 1310a indicates the upper plate 1310c of the module body 200.

The catching portions 230 are respectively formed on one side of an upper part of an outer peripheral surface of the small diameter portion 1310a and the opposite side, i.e., other side. When the hydrogen water module 100 is mounted on the head 300, the two catching portions 230 are respectively inserted into the two caught portions 330 formed at the head 300, and the hydrogen water module 100 can be fixed to the head 300.

A circular second fitting groove 1319b is formed over the entire perimeter at the outer peripheral surface of the small diameter portion 1310a. The second fitting groove 1319b is disposed on the upper part of the catching portion 230, and the second packing 263 is inserted into the second fitting groove 1319b.

A band-shaped rib 243 may be formed in a circular shape along the outer peripheral surface at a lower part of the outer peripheral surface of the small diameter portion 1310a.

The large diameter portion 1310b is integrally formed at the lower end of the small diameter portion 1310a.

The large diameter portion 1310b is a portion in which the components included in the hydrogen water module 100 are inserted and installed, and has a cylindrical shape having a larger diameter than the diameter of the small diameter portion 1310a.

The wire holes 227a and 227b penetrated toward an inner peripheral surface may be respectively formed on one side of an upper part of an outer peripheral surface of the large diameter portion 1310b and the opposite side, i.e., other side. An upper end of the inner peripheral surface of the large diameter portion 1310b may be stepped.

The guide 1370 having a corresponding step is inserted and disposed on the stepped upper side at the inner peripheral surface of the large diameter portion 1310b. It is preferable that a guide packing 1371 is interposed between the stepped upper side on the inner peripheral surface of the large diameter portion 1310b and the stepped portion of the guide 1370.

The negative (−) electrode member 211a, which may be a lower electrode, may be disposed in the lower portion of the space 211, i.e., inside the large diameter portion 1310b,
and the diaphragm 1330 may be stacked on the upper surface of the negative (−) electrode member 211a. The positive (+) electrode member 211b, which may be an upper electrode, may be stacked on an upper surface of the diaphragm 1330, and the third packing 1331 may be interposed between the positive (+) electrode member 211b and the diaphragm 1330.

The negative (−) electrode member 211a, the diaphragm 1330, and the positive (+) electrode member 211b arranged in this way are supported by the locking member 1350 and the pressing plate 1360 to be described later and are installed by being fixed to the inside of the module body 200.

In this instance, the lower surface of the guide 1370 may be stacked on the upper surface of the positive (+) electrode member 211b, and a fourth packing 1341 may be interposed between the positive (+) electrode member 211b and the guide 1370.

The negative (−) electrode member 211a and the positive (+) electrode member 211b may be configured to electrolyze water contained in the space 211 and generate hydrogen water.

The negative (−) electrode member 211a and the positive (+) electrode member 211b may be provided with a plurality of holes that are vertically penetratingly formed.

A lower electrode terminal 1320a, to which an electric wire may be connected, may be formed at one end of the negative (−) electrode member 211a, and may be accommodated in one wire hole (e.g., 227a) of the two wire holes 227a and 227b. Further, an upper electrode terminal 1340a, to which an electric wire may be connected, may be formed at one end of the positive (+) electrode member 211b, and may be accommodated in the remaining wire hole 227b.

When electric power is applied to the negative (−) electrode member 211a and the positive (+) electrode member 211b through the lower electrode terminal 1320a and the upper electrode terminal 1340a, they electrolyze the water contained in the space 211 through the water inlet port 261. Then, oxygen generated through the electrolysis moves to the lower side of the negative (−) electrode member 211a and exits to the lower part of the module body 200, and hydrogen generated through the electrolysis is dissolved in the water contained in the upper part of the positive (+) electrode member 211b. When an amount of hydrogen dissolved in water reaches a predetermined amount, the water is converted into hydrogen water and is discharged through the water outlet port 251.

It is preferable that the locking member 1350 is fastened to a lower opening of the module body 200, and at this time, the pressing plate 1360 is placed on an upper surface of the locking member 1350.

The locking member 1350 is inserted and fastened to the lower end of the large diameter portion 1310b to support the components installed inside the large diameter portion 1310b, and at the same time to prevent the component from being detached downward.

Each of the pressing plate 1360 and the locking member 1350 may be provided with a plurality of holes, that are vertically penetratingly formed, so as to discharge oxygen.

The locking member 1350 has a screw thread on the outer peripheral surface. The screw thread of the locking member 1350 is screw-coupled with a screw thread formed on the inner peripheral surface of the large diameter portion 1310b, and thus the locking member 1350 may be fixed to the housing 1310.

In this instance, the pressing plate 1360 is mounted on the upper surface of the locking member 1350, and the locking member 1350 is fastened to the module body 200. Hence, the pressing plate 1360 pushes the lower surface of the negative (−) electrode member 211a and can firmly contact mutually the components, i.e., the diaphragm 1330, the third packing 1331, the positive (+) electrode member 211b, the fourth packing 1341, the guide 1370, and the guide packing 1371 which are stacked on the negative (−) electrode member 211a in the vertical direction.

The hydrogen water module 100 configured as described above introduces water of the water supply tank T into the space 211 through the water inlet port 261 during operation, and then electrolyzes the water using the negative (−) electrode member 211a and the positive (+) electrode member 211b. The hydrogen water module 100 discharges oxygen to the lower part through the locking member 1350, and generates hydrogen water by dissolving a predetermined amount of hydrogen in water of the space 211. Then, the hydrogen water module 100 discharges the hydrogen water to the dispenser D through the water outlet port 251 and allows the hydrogen water to be taken out through the outlet port DO.

Although the embodiments have been described with reference to a number of illustrative embodiments thereof, numerous other modifications and embodiments may be devised by those skilled in the art that will fall within the scope of the principles of the present disclosure. In particular, various variations and modifications are possible in the component parts and/or arrangements of the subject combination arrangement within the scope of the present disclosure, the drawings and the appended claims. In addition to variations and modifications in the component parts and/or arrangements, alternative uses will also be apparent to those skilled in the art. The scope of the present disclosure should be determined by rational interpretation of the appended claims, and all modifications within an equivalent scope of the present disclosure are included in the scope of the present disclosure.

What is claimed is:

1. A refrigerator comprising:
   a refrigerator body having a storage space;
   a door provided in the refrigerator body and configured to open and close the storage space;
   a water supply tank provided in the refrigerator body or the door;
   a holder provided at one side of the door; and
   a hydrogen water module coupled to the holder.

2. The refrigerator of claim 1, wherein the hydrogen water module includes:
   a water inlet port connected to the water supply tank; and
   a water outlet port connected to a dispenser provided in the door,
   wherein the water outlet port is formed at an upper part of the hydrogen water module.

3. The refrigerator of claim 2, wherein the water outlet port is positioned above than the water inlet port.

4. The refrigerator of claim 2, wherein the water inlet port is formed radially around the water outlet port.

5. The refrigerator of claim 1, wherein the hydrogen water module includes a module body,
   wherein a head is coupled to the holder, and
   wherein the module body is assembled to the head.

6. The refrigerator of claim 5, wherein the head includes an assembly guide portion, and
   wherein the module body includes a catching portion corresponding to the assembly guide portion.

7. The refrigerator of claim 6, wherein at least a part of the assembly guide portion is formed spirally.

8. The refrigerator of claim 6, wherein the head further includes caught portions at both sides of the assembly guide portion, and
   wherein the catching portions are formed at both sides of the module body so that the catching portions are assembled to the caught portions.

9. The refrigerator of claim 6, wherein the module body includes a water outlet portion that is formed protrudingly, and
   wherein the head further includes an insertion portion into which the water outlet portion is inserted.

10. The refrigerator of claim 9, wherein the module body includes a body in which the water outlet portion is formed, and water is accommodated in the body,
    wherein a first packing is positioned between the water outlet portion and the insertion portion, and
    wherein a second packing is positioned between the body and the head.

11. The refrigerator of claim 1, wherein a module accommodation hole is formed in a lower side of the holder, and
    wherein the hydrogen water module is accommodated in the module accommodation hole, and at least a part of the hydrogen water module is positioned inside the holder.

12. The refrigerator of claim 11, wherein a part of the hydrogen water module is positioned below than the module accommodation hole and protrudes to an outside of the holder, and
    wherein the refrigerator further comprises a cap configured to accommodate a part of the hydrogen water module protruding from the holder.

13. The refrigerator of claim 1, further comprising:
    a pocket of which a lower part is coupled to the holder.

14. The refrigerator of claim 13, wherein the pocket includes a case and a cover installed inside the case,
    wherein a case hole is formed in a lower side of the case, and
    wherein at least a part of a hose and an electric wire connected to the hydrogen water module is accommodated in the case via the case hole.

15. The refrigerator of claim 14, wherein the case hole communicates with the holder, and
    wherein at least a part of a hose and an electric wire connected to the hydrogen water module is accommodated in the case via the holder and the case hole.

* * * * *